US008443461B2

(12) United States Patent
Ohnesorge

(10) Patent No.: US 8,443,461 B2
(45) Date of Patent: May 14, 2013

(54) INTERATOMIC FORCE MEASUREMENTS USING PASSIVELY DRIFT COMPENSATED NON-CONTACT IN SITU CALIBRATED ATOMIC FORCE MICROSCOPY—QUANTIFYING CHEMICAL BOND FORCES BETWEEN ELECTRONIC ORBITALS BY DIRECT FORCE MEASUREMENTS AT SUBATOMIC LATERAL RESOLUTION

(75) Inventor: Frank Michael Ohnesorge, Erlangen (DE)

(73) Assignee: Frank Michael Ohuesorge

( * ) Notice: Subject to any disclaimer, the term of this patent is extended or adjusted under 35 U.S.C. 154(b) by 14 days.

(21) Appl. No.: 13/227,733

(22) Filed: Sep. 8, 2011

(65) Prior Publication Data
US 2012/0331592 A1 Dec. 27, 2012

(30) Foreign Application Priority Data

Oct. 25, 2010 (GB) .................................. 1017967.9
Nov. 22, 2010 (DE) ......................... 10 2010 052 318

(51) Int. Cl.
G01N 13/16 (2006.01)
G01N 13/00 (2006.01)
G01Q 60/24 (2010.01)

(52) U.S. Cl.
USPC ........ 850/33; 850/1; 850/13; 850/21; 850/32; 850/40; 73/105

(58) Field of Classification Search ................ 850/1, 13, 850/21, 32, 33, 40; 73/105
See application file for complete search history.

(56) References Cited

U.S. PATENT DOCUMENTS

| | | | |
|---|---|---|---|
| 7,107,825 B2 * | 9/2006 | Degertekin et al. ............. | 73/105 |
| 7,249,002 B1 * | 7/2007 | Ben-Dov et al. .............. | 702/195 |
| 7,748,260 B2 * | 7/2010 | Su et al. .......................... | 73/105 |
| 8,050,802 B2 * | 11/2011 | Young ........................... | 700/279 |
| 8,239,968 B2 * | 8/2012 | Torun et al. ..................... | 850/33 |

* cited by examiner

Primary Examiner — Nikita Wells

(57) ABSTRACT

Interatomic forces are measured with subatomic lateral resolution by in situ calibrated non-contact and passively thermal drift compensated atomic force microscopy in aqueous or generally liquidous environment; interatomic forces acting between distinct electronic orbitals of front-most tip atom and opposing sample atom can be quantitatively measured with subatomic lateral resolution. Calibration standard is a $CaCO_3$-crystal, which undergoes a well defined pressure induced phase transition from the calcite to the aragonite crystal lattice structure providing an accurate independent force anchor point for the AFM's force versus distance curve. Furthermore, an independent actual tip-sample-distance d calibration is obtained by directly observing oscillatory (steric) solvation forces originating simply from packing effects of the liquid particles at very small tip-sample separations d.

Key to achieving this extreme sensitivity is operating the AFM in the simple variable deflection mode in the non-contact regime while specific mechanical instrumental design minimizes thermal drifts.

24 Claims, 24 Drawing Sheets

Figure 13:
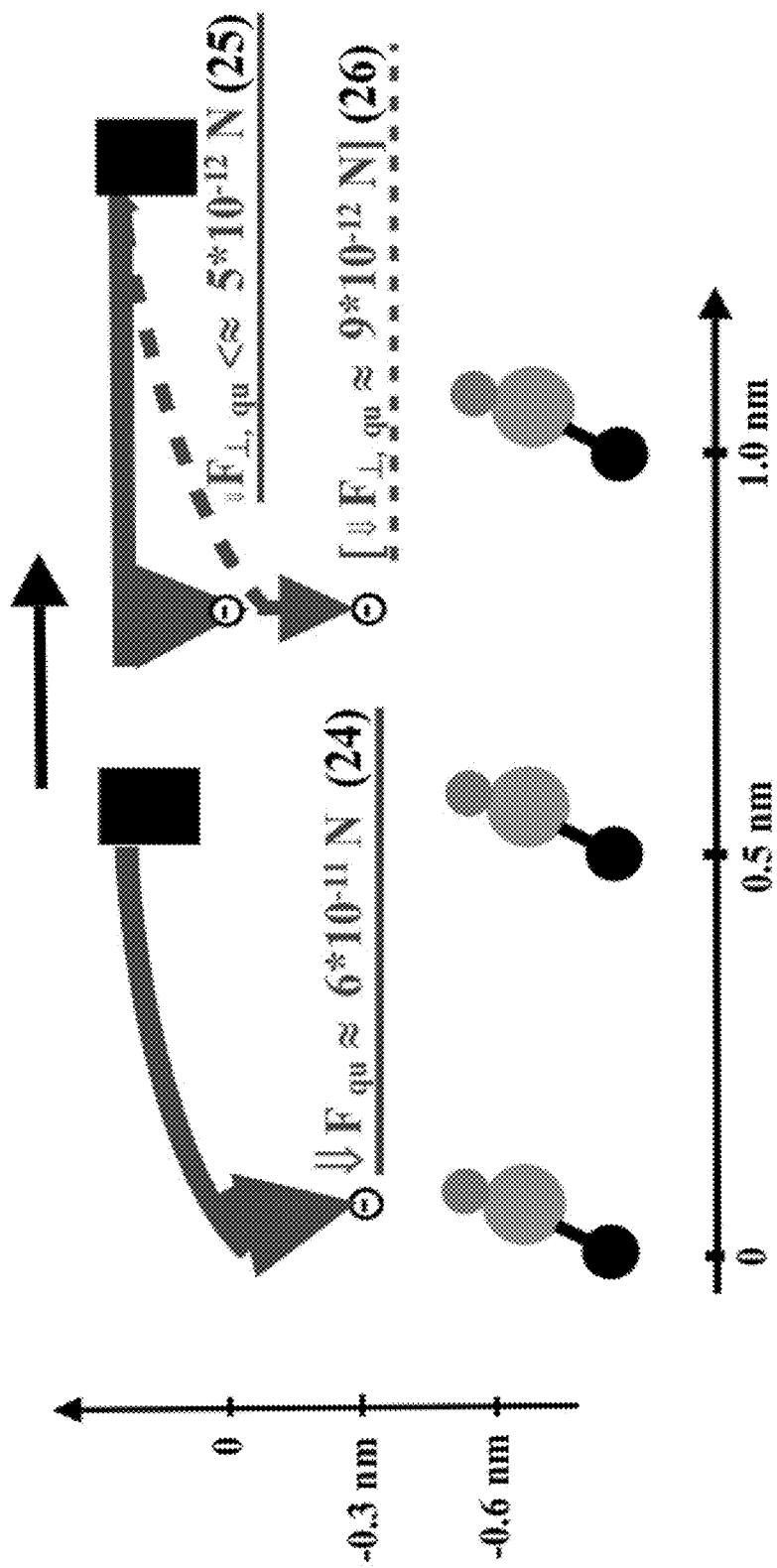

Fig. 13 Plausibility of the sharpness of the „attractive force spikes"

Fig. 19
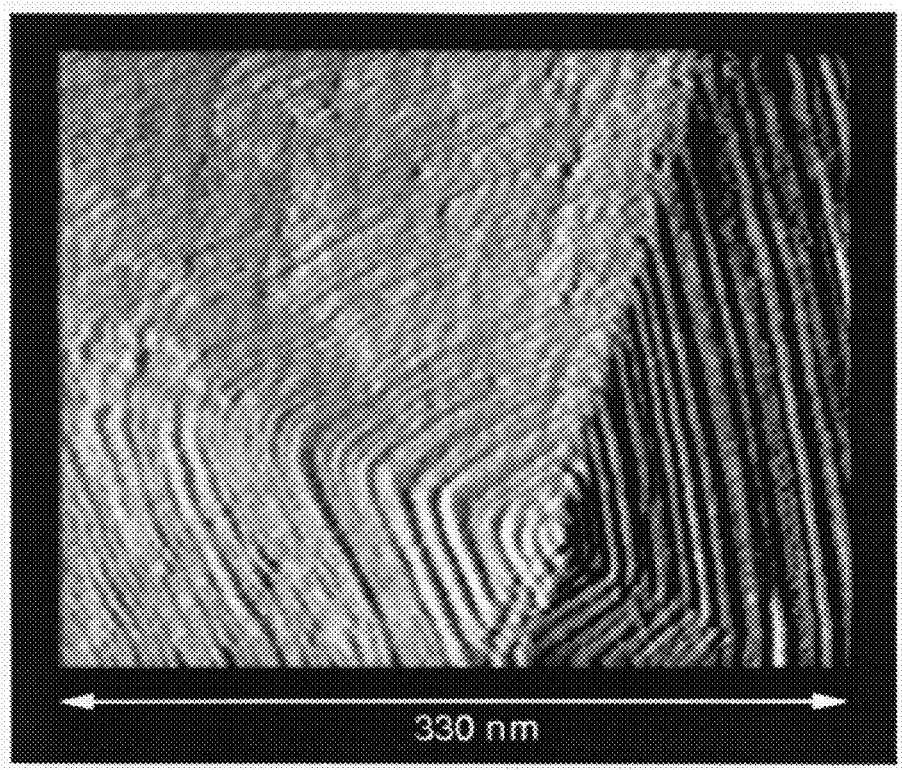
A) 330 nm
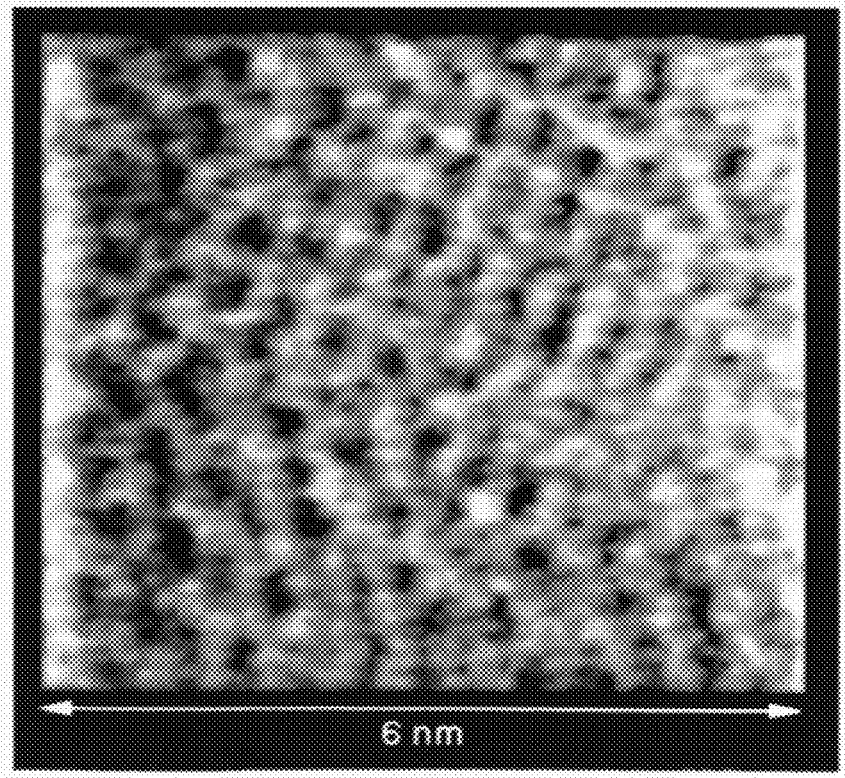
B) 6 nm

Fig. 23
A)
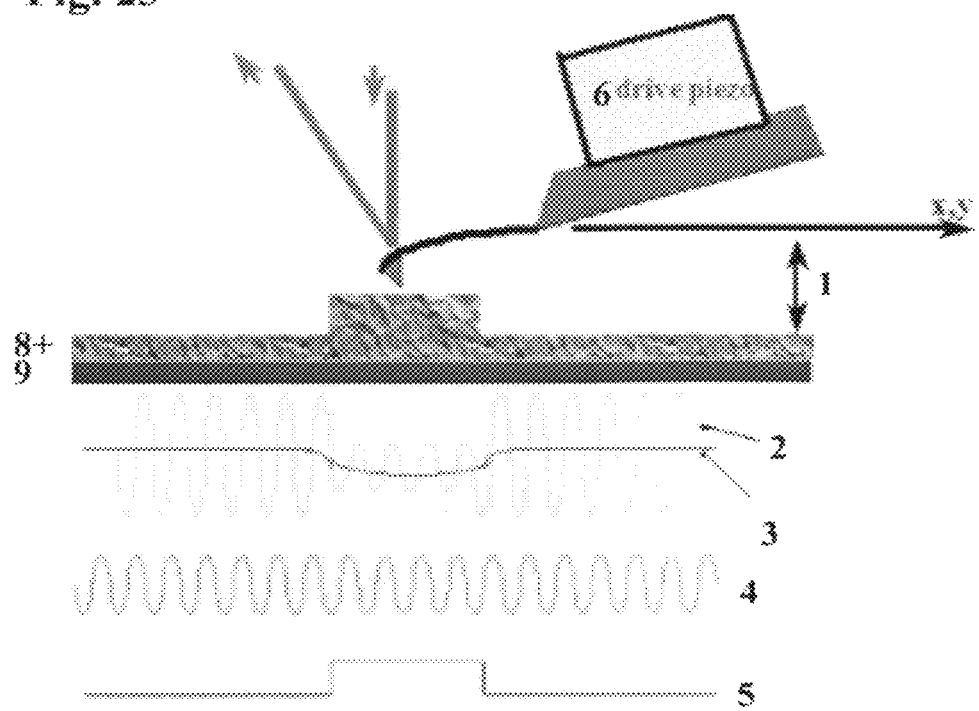
B)
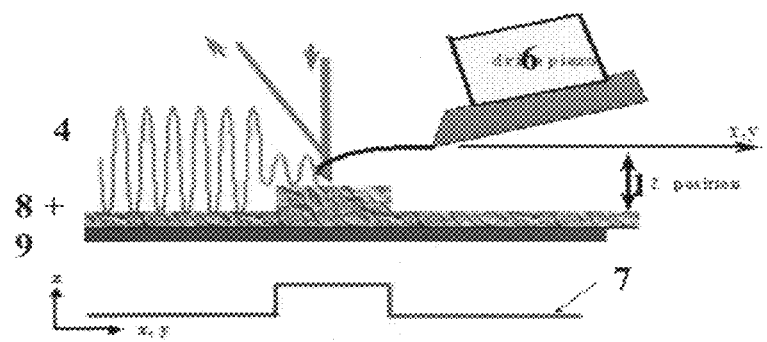
C)
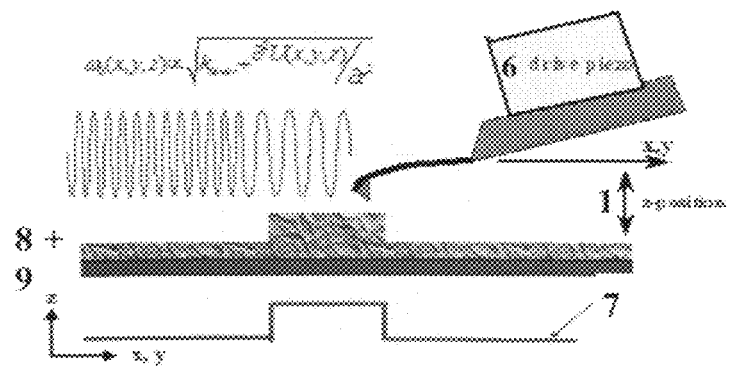

INTERATOMIC FORCE MEASUREMENTS USING PASSIVELY DRIFT COMPENSATED NON-CONTACT IN SITU CALIBRATED ATOMIC FORCE MICROSCOPY—QUANTIFYING CHEMICAL BOND FORCES BETWEEN ELECTRONIC ORBITALS BY DIRECT FORCE MEASUREMENTS AT SUBATOMIC LATERAL RESOLUTION

SUMMARY

In this invention, interatomic forces are measured with subatomic lateral resolution by in situ calibrated non-contact and passively thermal drift compensated atomic force microscopy in aqueous or generally liquidous environment, hence, interatomic forces acting between distinct electronic orbitals can be observed. As a standard sample for the calibration serves a calcium carbonate crystal, which undergoes a phase transition from the calcite to the aragonite crystal lattice structure at a well defined pressure and temperature and thus direct imaging of this phase transition provides an accurate force anchor point for the AFM's force versus distance curve—which actually is the force F plotted against a relative sample position z—completely independent of regular instrument calibrations usually via the spring constant of the commercially available cantilever. Besides an independent force calibration, also an independent actual tip-sample-distance d calibration is obtained by directly observing oscillatory (steric) solvation forces originating simply from packing effects of the liquid particles at very small tip-sample separations d. Based on this accurate, instrument-independent in-situ calibration, interatomic forces acting between electronic orbitals of front-most tip atom and opposing sample atom can be quantitatively measured with subatomic lateral resolution. One key to achieving this extreme sensitivity is operating the AFM in the simple variable deflection mode in the non-contact regime while the cantilever's spring constant is chosen just stiff enough such that no instability—i.e. no jump-into-contact—in the force curves is observed in the given environment which is here for instance a very dilute calcium carbonate solution but otherwise the cantilever spring should be as soft as possible. For the calcite-water system and the mica-150 mM NaCl-solution system this spring constant is selected to be about of order 0.1N/m. The this way enabled non-contact operation of the AFM solely measuring purely attractive forces between front atom of the tip and an opposing sample atom is extended to a dynamic (oscillatory) force microscopy method in a liquid at (almost) true atomic resolution which allows a feedback control of the fly-height of the tip above the sample and thus allows a constant height/constant interaction mode providing calibrated height information about topographic sample structures on the true atomic scale.

In atomic force microscopy, true atomic resolution is best achieved by keeping the imaging tip within the non-contact regime of the tip-sample separation while it senses mostly purely attractive interatomic forces between the front-most imaging atom and the sample atoms to be imaged. This imaging technique when using the so-called variable deflection mode while the force feedback is switched off is equivalent to actually quantitatively measuring interatomic forces between the front-most tip atom and the sample atom which is located directly underneath that tip atom and even a 2-dimensional map of the sample surface atoms can be generated this way where the topography data directly reflect the quantitative interaction forces between the front most tip atom and the sample atom which lies directly underneath. In atomic force microscopy, when using a $SiO_2$-tip and imaging oxygen atoms on a cleaved crystal surface, as for instance on calcite, mica or $SiO_2$-wafers, the this way measured interatomic forces will mostly be of electrostatic or dispersion force nature and especially in an aqueous liquid they will represent the hydrogen bonding forces between the two oxygen atoms interacting, while the longer range electrostatic forces and dispersion forces are screened in an aqueous liquid beginning from medium tip-sample separations. The so-called double layer forces originating from Debye screening of the electrostatic interaction by the positive and negative ions present in the aqueous liquid only provide an offset to the longer range forces acting on the tip and are not involved in the interatomic forces providing true atomic resolution contrast in atomic force microscopy. In an aqueous liquid, the true atomic resolution contrast in repulsive force mode AFM originates from (repulsive) electrostatic forces or even Pauli-exclusion-principle repulsion once the front-most atom of the tip pokes through the so-called Helmholtz-layer, the first monomolecular layer of water molecules or the hydronium- and hydroxid-ions respectively i.e. once the front-most tip atom literally sees—in an unscreened fashion—the upper-most sample atoms. The true atomic force resolution contrast in attractive mode imaging in an aqueous liquid originates from attractive dispersion (van der Waals) forces and in special cases even from hydrogen bonding forces, once the front-most atom of the tip pokes through the so-called Helmholtz-layer, the first monomolecular layer of water molecules respectively hydronium- and hydroxid-ions i.e. once the front-most tip atom literally sees—in an unscreened fashion—the upper-most sample atoms. In UHV, the true atomic force contrast forces are of course exactly the same as in a liquid, however the for the AFM-imaging process advantageous longer range screening of electrostatic and dispersion forces as is found in a liquid, is not present here and thus the background forces that have to be compensated with be much larger; in UHV, compensation of background forces is done by simply using much higher spring constant cantilevers, which are of course much less sensitive to direct interaction force measurement, which is why, in UHV mainly the more sensitive dynamic (amplitude modulation and frequency modulation) atomic force imaging techniques are employed.

STATE OF THE ART

In [1], to my knowledge for the first time true atomic resolution has been achieved by atomic force microscopy, not only using repulsive imaging contrast forces but also using purely attractive imaging forces acting on the front-most tip atom, thus acting between the front-most tip atom and the instantaneously imaged sample atom. Not only the correct atomic surface structure of calcium carbonate ($CaCO_3$)— showing both ion species and the carbonate ion even with the correct position of the oxygen atom protruding out of the calcite crystal cleavage plane was revealed in an aqueous liquid but also monoatomic steplines were clearly imaged even revealing point defects in form of kinks. Non-contact attractive force variable deflection mode (without force feedback) provided the highest resolution images of the $CaCO_3$ unit cell, repulsive force constant height mode (with force feedback) provided as yet the best images of atomic steplines. In [2]—to my knowledge for the first time—true atomic resolution was achieved by AFM in UHV on a Si-111-(7×7) surface reconstruction using the frequency modulation detection technique, however no defects were seen. In [3], almost true atomic resolution was achieved by dynamic atomic force microscopy, in this case using a hybrid technique between non-contact atomic force microscopy and tapping mode in liquid, i.e. an amplitude demodulation technique with inverted contrast indicating a working point in the non-contact regime. In [4], again true atomic resolution on calcite was achieved in water, but this time there in [4] frequency modulation detection technique in a liquid was claimed, which requires for a very stiff cantilever, which most likely is the reason why the authors had difficulties to image defects, steplines would probably simply get wiped away as the working distance of such stiff cantilevers even in the frequency demodulation mode has to be very small in order to poke through the Helmholtz (water) layer and thus in order to sense enough of the interaction (the force gradient) to obtain enough contrast from the frequency (de-)modulation detection technique. Clear point defects were observed by frequency demodulation detection non-contact AFM in UHV on InP (110) though—to my knowledge for the first time in [5], which confirms—besides the correct resolving of a complicated unit cell—having achieved true atomic resolution. Imaging atomic step-lines with true lateral atomic resolution brings in another difficulty into dynamic force AFM because the force gradient feedback in non-contact AFM has difficulties to "regulate/control away" high topography features without crashing the tip; the frequency modulation feedback with solely the via the variable force gradient shifted cantilever resonance frequency as the measured parameter—not the force itself—would thus need the force itself as an added measured parameter in order to be able to control away the high "jump-up" at an atomic step/terrace as was partially successfully attempted in [3]. In [6] it was claimed in the title that subatomic features on the Si-111-7×7 were observed, however, it is stated clearly already in the abstract, that these subatomic features clearly did not originate from the sample atoms themselves but rather from an asymmetry of the tip on the subatomic scale, a sub-atomic scale double tip so to speak. This becomes clear from FIG. 1 of [6], where those subatomic features all are seen completely equal and in particular equally oriented and directed, just like usually typical double tip artifacts as often seen in larger scale AFM-images—i.e. there the sample surface's silicon ad-atoms—having a relatively large interatomic spacing of approximately almost 8 Angströms on the Si-111-(7×7)—are actually imaging the single front-most tip atom(s) and not vice versa as it should be. However, since the complicated unit cell of the Si-111-7×7 is clearly and correctly resolved, with all ad-atoms showing this same asymmetry, it is indeed very likely that these in [6] described features are indeed originating from subatomic features (electronic orbitals) on the front end of the tip—in a way a double tip on the subatomic scale. But in my view, it has not been by 100% completely ruled out in [6] that perhaps a secondary neighboring tip atom could be responsible for the apparently observed subatomic-scale features in the image, because the oxygen atoms in $SiO_2$ at the very end of the tip are much more closely separated than the Si-adatoms on the Si-111-(7×7) and thus this double tip could simply be those 2 oxygen atoms of the tip's $SiO_2$-molecule, which also would be roughly in accordance to the size of these "mushroom"-shaped structure details claimed to be of "subatomic" origin in [6] whose maxima are roughly 2-3 Angströms apart (thus much larger than an electronic orbital model of $sp^3$-oxygen) and further because the Si-111-(7×7) is still a periodic structure, even though with a very complicated unit cell incorporating many ad-atom positions. On a very simple periodic structure, of course, any double tip with the two imaging tips being separated perhaps by many atomic distances, could easily produce an arbitrary unit cell, perhaps even with features on an apparent subatomic scale, which is most likely not the case in [6]. In essence, those mushroom-shaped images of single Si-adatoms in my view are too large (the two internal detail-maxima are about 2-3 Angströms apart) to even originate from a subatomic-sized double tip; I simply assume these atomic mushrooms-shapes reflect the image of the Si-adatoms probed by a Si—$O_2$ double tip, perhaps simply the two oxygens forming the two tips.

PROBLEM

In order to actually quantitatively measure interatomic forces between literally two atoms, true atomic resolution in atomic force microscopy is a necessary prerequisite since all interaction force measurements that display "blind" force-versus-distance curves as measured with an atomic force microscope are never able to unambiguously state, how many atoms actually are interacting and whether the tip has perhaps already been damaged or contaminated. Hence, the only way to obtain truly interatomic force measures is to record a non-contact AFM image with true atomic resolution and to read out the quantitative force values from these images at the atomic locations on the sample surface—for which task an optimal thermal drift compensation is required, since non-contact AFM is much more demanding on the microscope's stability than contact-mode AFM. Since these forces all originate from interaction of atomic and molecular electronic orbitals, in order to learn about the interatomic forces present in a chemical reaction between two atoms or molecules, it is of course desired to achieve subatomic resolution by AFM in an aqueous or other liquidous environments. If true atomic resolution is obtained, then it is most likely also the case that only one tip atom is sensing the imaging force contrast, if true subatomic resolution were obtained, it is clear, that only an atom's electronic orbital is sensing the interatomic (chemical bond) forces. In UHV, frequency demodulation non-contact AFM is of course the method of choice for AFM-imaging with true atomic resolution (see also FIG. 23C). However, to derive the actual imaging forces from that method quantitatively is a very difficult task if not impossible, since this technique primarily measures the force gradient of the interatomic force interaction, not the force itself and in order to calculate the force itself by integrating the measured force gradient, a reliable force anchor point as a starting value is needed. Moreover, even the force gradient's anchor point as derived from the cantilever's frequency shift with respect to the intrinsic resonance frequency of the AFM-cantilever spring upon approaching the cantilever from far away from the sample surface towards the sample is not a reliable starting point, especially in a liquid, as all the above mentioned long range offset force interactions will alter that anchor point force gradient. Thus the force gradient as approximately determined by the formula $|grad\ F| \approx 2k^*\delta\omega/\omega_0$ is not a reliable absolute value for the interaction force gradient either because $\omega_0$ is illdefined, especially when working in a liquid; only the differences of the frequency shifts $\delta\omega$ as they vary across the surface are accurate measures of the relative variations of the interaction force gradient. In essence, absolute values of interaction forces between to single atoms can only be reliably recorded by direct measurement of a cantilever's "DC"-deflection (so-called "DC"-AFM, preferably in variable deflection mode without feedback control or in constant height mode here then with inverted feedback response as compared to usual contact (repulsive force) mode AFM) at a given separation between the front-most tip atom and the sample surface atom to be examined.

SOLUTION

The key to achieving extreme resolution in atomic force microscopy is to avoid thermally and stress—and strain—induced mechanical drifts before they even occur, since an active drift compensation which often has been attempted in the over two decades long history of scanning probe microscopy is an extremely difficult task to master and not seldomly more problems arise from it instead of improving resolution; the same holds true for the SPM's own feedback control loop—which obviously also corrects vertical drifts within certain limits when maintaining a constant fly height of the tip above the sample—because it also introduces noise to the signal the more and the faster and the more variable—i.e. with higher bandwidth—it has to move the z-position controlling sample piezo in order to compensate for a vertical drift of the tip with respect to the sample.

Hence, for ultra low noise atomic force microscopy measurements, drift has to be avoided before it even occurs; this is commonly achieved by extreme low temperature instruments such as operating the AFM at liquid helium temperatures (−273° C.), where all thermal drifts can be well expected to be frozen out. Of course, if aiming at measuring chemical bond forces, the AFM has to be operated with cantilever, tip and sample surface immersed in an aqueous liquidous environment at temperatures above freezing level of the aqueous solution used obviously. Thus there the drift compensation has to be achieved by instrumental design and construction features as well as by suitable choice of low thermal drift materials and composites.

Figure 24:
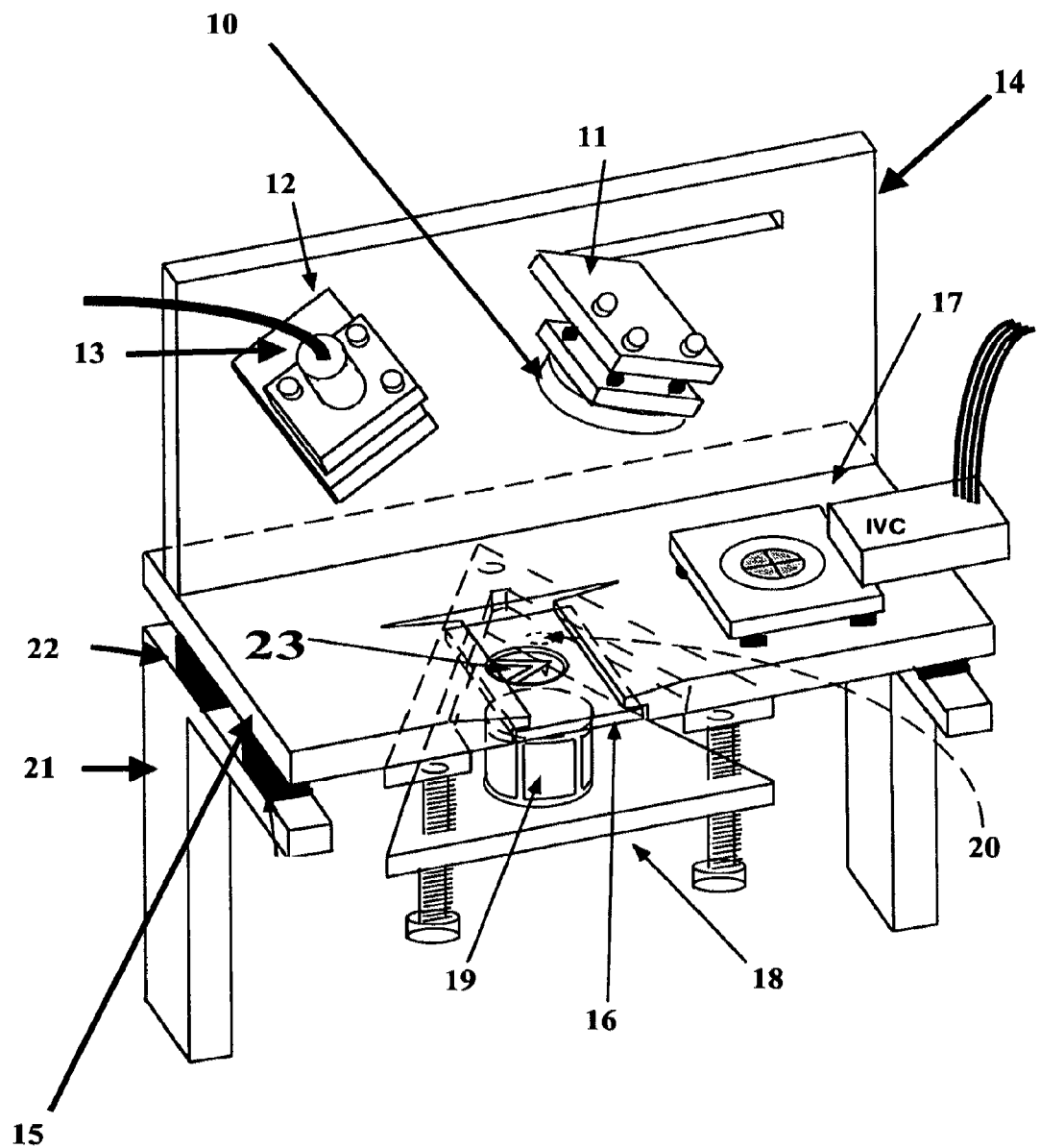

FIG. 24 now shows an AFM-design specialized for operation in a liquid at approximately room temperatures or at least above freezing level of the immersing liquid, with the microscope otherwise in an environment of ambient atmosphere or dry and inert and optically transparent gases or in moderate vacuum, always being under temperature control.

The concept for drift avoidance and compensation here is selecting suitable materials for specific parts of the shown specific microscope design having specifically desired thermal properties. The microscope backbone (base plate and vertical plate) including the cantilever holder are made from very solid, rather heavy and extremely hard and thermally extremely stable—i.e. most of all extremely low thermal expansion coefficient at high heat capacity but also low heat conduction coefficient—materials such as Invar and Quartz which simultaneously due to their high heat capacity serve as a heat reservoir/heat sink for the entire microscope. At the same time all mechanical adjustment stages (sample scanner adjustment mount, light source adjustment mount, further optical adjustment mounts of mirror and detector) which experience frequent local temperature changes e.g. due to variable heat flow from the laser diode, due to heat generation by the dissipation of an occasionally rapidly moving or even oscillation sample scanner piezo or even due to heat transfer into those mechanical adjustment parts by simply touching them when performing a mechanical adjustment by hand, are all made from very light (for achieving high mechanical resonances), rapidly thermally equilibrating due to a high heat conduction coefficient materials at still relatively low thermal expansion coefficients and still high heat capacity such as aluminum, magnesium, titanium or alloys thereof.

Thus, temperature changes induced into these mechanical adjustment stages equilibrate rapidly during performing an experiment and all thermal drifts will settle soon after beginning an experiment with these adjustment stages e.g. made from aluminium and excess heat is sinked or kept in reserve in the high heat capacity AFM-backbone materials such as Invar and Quartz—the latter are very solid, hard, stiff, heavy and most of all largely thermally inactive such that the (small) temperature changes induced locally in these heat-sink components will not cause significant drift either.

Hence, during an experiment, the significant thermal drifts induced through the necessarily light mechanical adjustment stages will equilibrate and thus die out rapidly during the first minutes of the experiment while the the thermal drifts in the heavy backbone materials are negligibly small although they will not equilibrate during the experiment. This way, not only vertical (z-) drifts are compensated/avoided but also the equally disturbing lateral (x-y-) drifts—it is hereby noted that the AFM's feedback loop is only able to compensate z-drifts of course and with the above mentioned disadvantages.

Figure 1:
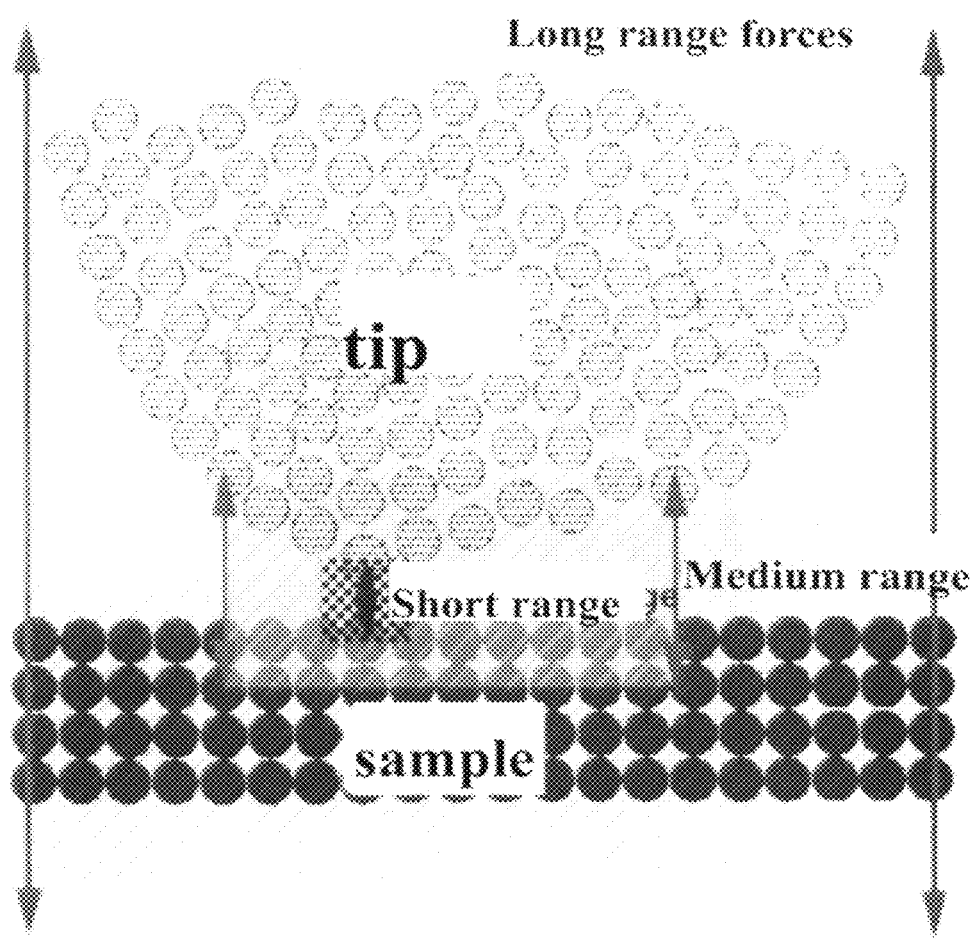

The key to—even quantitatively—measuring interatomic forces between single atoms or even an single atom's single electronic orbitals directly using atomic force microscopy is using a cantilever with the spring constant just hard enough in a given (liquidous/aqueous) environment that it doesn't show the typical force instability i.e. the typical "jump-into-contact" at that tip sample separation at which the force gradient (absolute value) starts to exceed the cantilever's spring constant and at the same time the attractive tip-sample force starts to be or already is bigger than the pull-back force of the cantilever spring at a given tip-sample separation in a given environment (air, liquid, UHV). Such a cantilever can be chosen even softer and thus more sensitive for force measurements, if the often rather strong attractive background forces are literally switched off: In UHV and in a liquid the very strong (order of $10^{-7}$N) capillary forces due to water layers present in ambient conditions on tip and sample are obviously largely switched off, while dispersion forces (van der Waals forces) of order $10^{-9}$N are still in effect. In UHV, these always attractive dispersion forces are strongly present, while in a liquid due to similar refractive indices of the sample and the liquid, these dispersion forces are largely compensated—they can even result in a total repulsive force if according to the mutual refractive indices of tip-, sample-, and liquid material, the liquid material gets attracted more strongly than the tip material by the sample. It is noted, that there is no actual screening for the always attractive dispersion/van der Waals forces, thus they have long range (increasing inverse quadratically with decreasing tip-sample separation for macroscopic—hemispherical-plane—objects that are interacting) background attraction force components (integrating over all atoms/molecules in the whole tip and sample material, depending on tip and sample geometry as described by the Hamaker constant) as well as a medium range attractive force component (integrating over the atoms in the first few atomic layers in tip and sample materials, also geometry/tip radius dependent as described by the Hamaker constant) as well as very short range (proportional separation$^{-7}$) force components only involving the front-most tip atom and the opposing sample atom. FIG. 1 crudely sketches this situation of having long-, medium-, and short-range (attractive dispersion) forces acting between tip and sample surface in the non-contact regime, but also in the contact regime where Pauli-repulsion forces will suddenly dominate.

Figure 2:
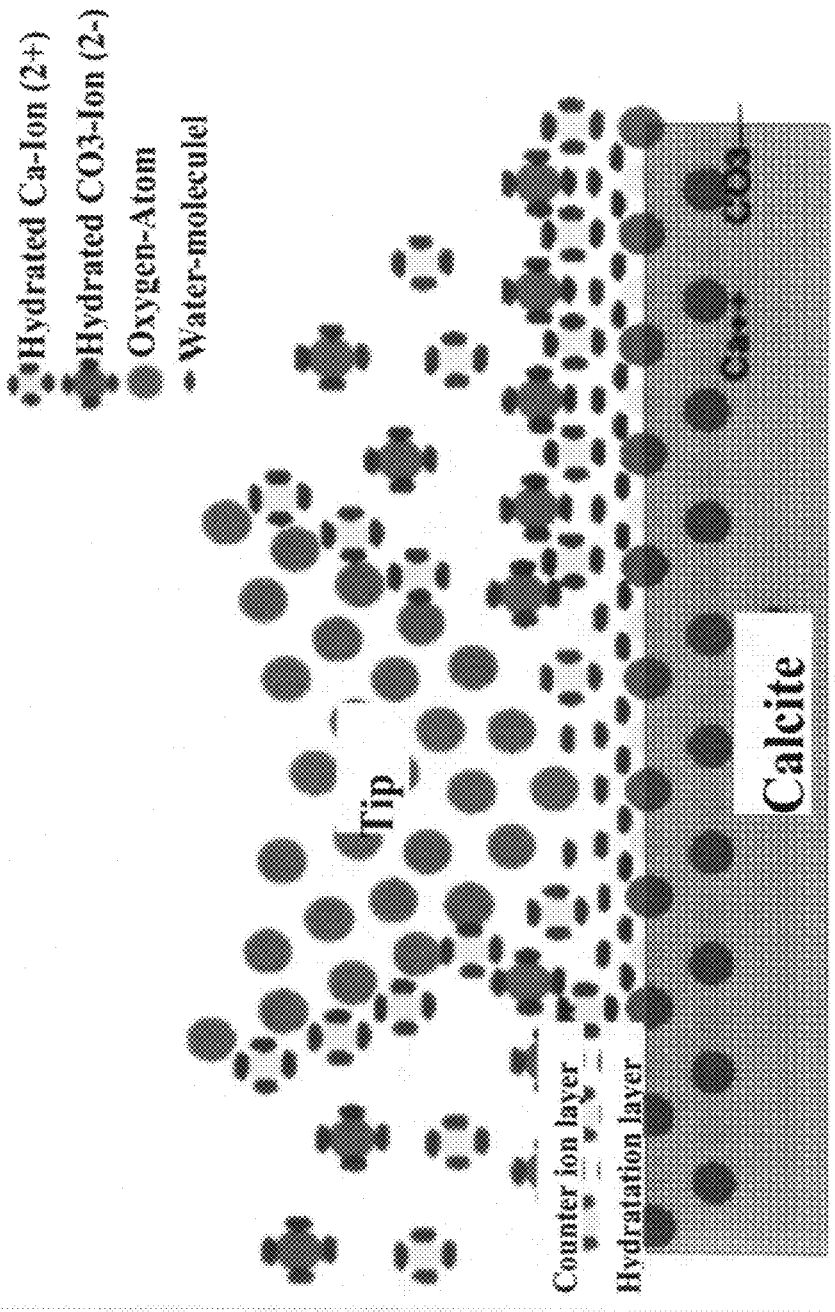

Furthermore, in aqueous (ionic) liquids, rather longer range double layer repulsion forces (originating from Debye screening of the electrostatic interaction forces—attractive or repulsive—between tip and sample atoms) and simply steric repulsion of the first few liquid particle layers (the so-called Helmholtz-/Stern-layer) of order $10^{-10}$N further holds the tip back and prevents it from jumping into contact if mounted on a rather soft cantilever spring. However, once the front-most tip atom pokes through the lowest Helmholtz-/Stern-layer, this front-most tip-atom and the opposing sample atom directly "see" each other just like in UHV while the attractive background forces are now compensated and the remaining attractive actual imaging forces are of order $10^{-12}$N to $10^{-11}$N; hence, mainly and approximately speaking, only the strong and unscreened electrostatic interaction forces (repulsive and/or attractive, proportional to separation$^{-2}$), the very short range (proportional to separation$^{-7}$) attractive dispersion forces between the two single atoms unreduced in strength and range since now there are no intercepting liquids anymore and finally when tip and sample atoms get in immediate contact, the Pauli exclusion principle repulsive force (proportional to $e^{-separation/\lambda}$, where $\lambda \approx 0.01$ nm) are solely in effect. For completeness, it is noted that there is variations of all these actual imaging forces with different force versus tip-sample-separation behaviors, resulting from further force components added to the above mentioned force component contributions for instance by considering dipole moments and atomic polarizabilities of the interacting front-most tip atom and opposing sample atom. All longer range background forces are literally switched off in a liquid by the mentioned screening and dispersion force "effective reduction" effects simply since on the sides of the front-most tip atom sitting at the very end of a rounded tip there still is liquid material between tip material and sample material. See FIGS. 1 and 2 as well as [7] for a list of the various imaging forces in effect in a liquid, where FIG. 2 is already sketching the specialized case of an Si/SiO$_2$-tip and a calcite (10$\overline{1}$4) sample (cleavage plane) surface in distilled water.

In the optimal case for recording interatomic forces by AFM, complete so-called AFM-force-versus-distance-curves (i.e. the cantilever deflection force plotted versus a relative sample position measured with respect to the cantilever base) are recorded pixel-wise and thus also on each sample atom the actual distance dependency of the interaction force between front-most tip atom and opposing sample atom is obtained by a simple transformation of the AFM's force versus distance curve, which is however only then unambiguously possible if there is no instability/jump into contact of the tip occurring in the AFM's force versus distance curve. Hence, for a freely selectable distance between the tip's front atom and the each time opposing sample atoms a complete AFM image can be derived from these data. However, this is not practical as the resonance frequency of the cantilever spring and in particular the mechanical resonance frequency (which is thus limiting the feedback loops time constant to some minimum value due to introduced phase shifts) of the z-scanner piezo restrict this pixel-wise recording of force versus distance curves such that it can be done only very slowly, obviously with lots of drawbacks regarding accuracy due to thermal drifts at room temperature or even at any temperature, as the rapid driving of the z-piezo will result in heating of the z-piezo even in a liquid helium (lowest temperature) environment. The second best choice thus is, to record force-versus distance curves as rapidly as practicable and simultaneously have the tip laterally scan very slowly across the sample surface and thus record three types of force-versus-distance curves, firstly on top of the sample atoms, secondly exactly above interstitial atomic sites on the sample (crystal) surface and thirdly above intermediate sample sites on the atomic scale. It is noted, that as long as there is no instability observed, the typical and well-known AFM's force-versus-distance curve (displaying cantilever spring deflection versus the sample's relative z-position) and the actual atomic interaction force versus separation behavior of the tip's front atom and opposing sample atom are—besides an offset in z-position which varies with the instantaneous lever deflection/tip excursion—identical when disregarding elastic deformations of the sample and the tip on an atomic scale; this is not so if there is a jump-into-contact occurring in which case the AFM's typical force scan has more or less nothing to do with the actual interaction force versus tip-sample separation behavior, except for very large separations which however are irrelevant for the AFM-imaging process—all relevant interaction force characteristics would then be occurring in the then inaccessible regime which the tip would then be overleaping.

Figure 3:
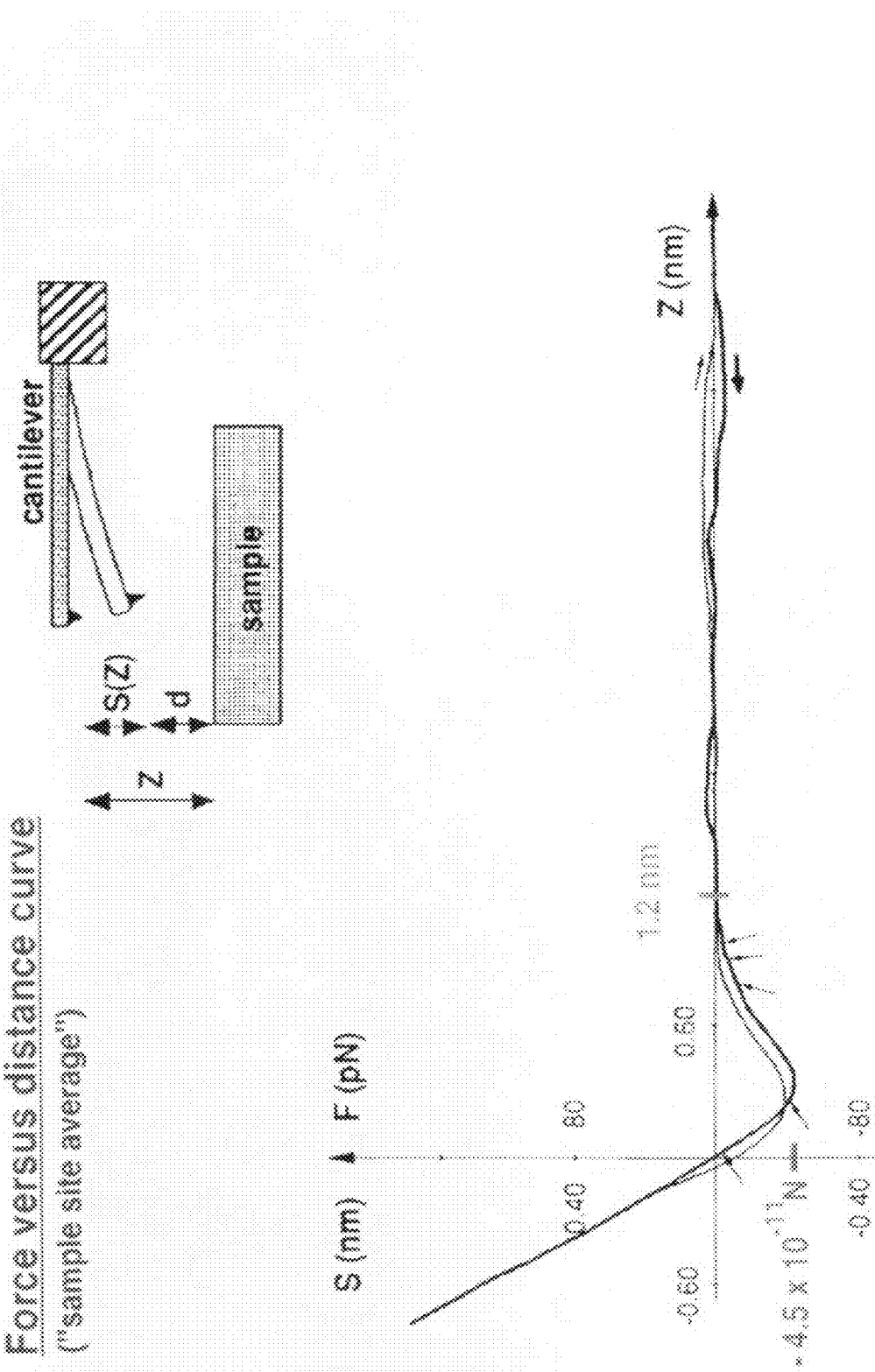
Figure 4:
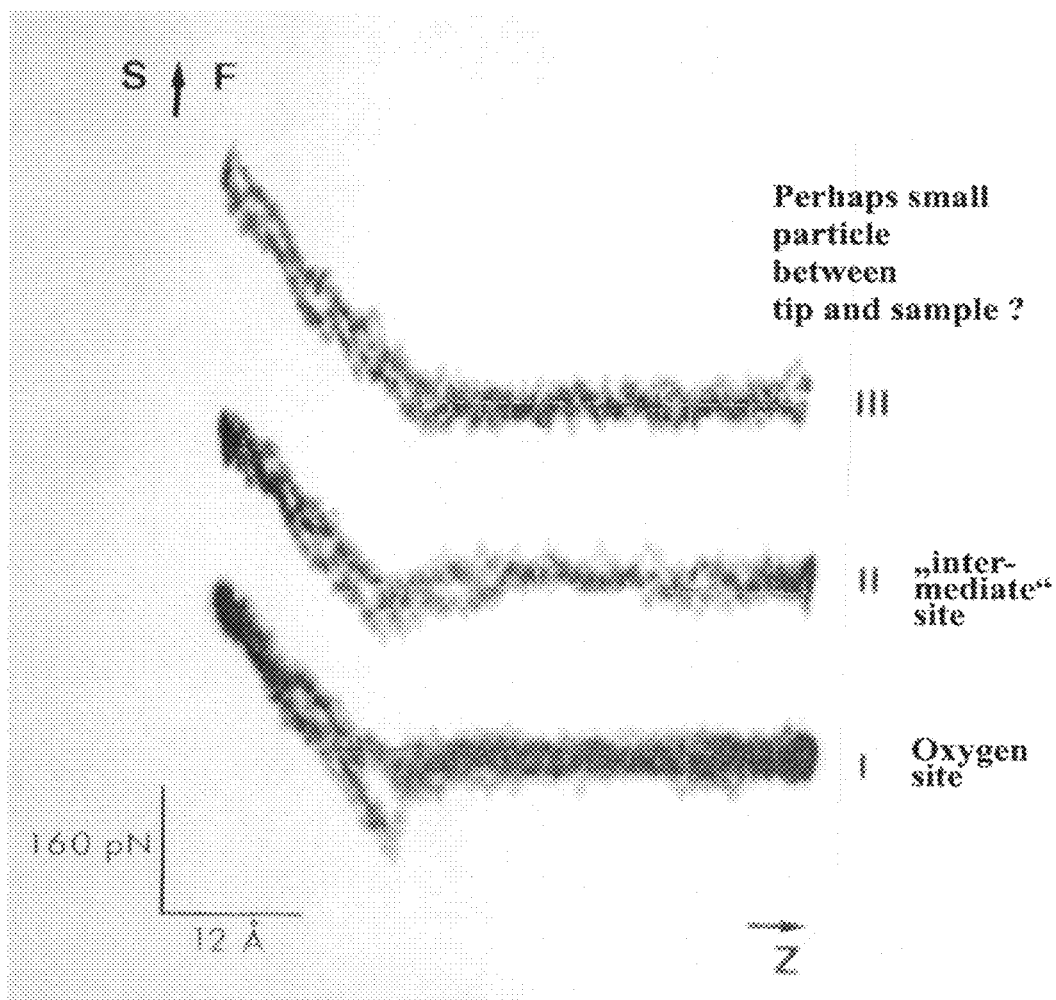

FIG. 3 now shows a typical AFM force versus distance curve, averaged while the tip is laterally rapidly scanning across the sample surface, here a calcite surface in water as well as a schematic showing the experimental situation. It is noted, that there is no jump into contact visible using a cantilever spring having a few 0.1N/m spring constant, the tip steadily moves from far away towards the contact point roughly at the point of inflection on the right side of the minimum of the force curve and thus the actual (but averaged over many sample sites) interaction force potential of front most tip atom and opposing sample atoms is continuously accessible until the front end of the tip literally touches the sample. FIG. 4 now shows typical force scans recorded rapidly at a cycle rate of about 50 Hz while the tip is only extremely slowly moving sideways (about 1 Ångström per sec or less) and clearly three different types (I, II, III) of force curves are recorded where type I clearly is recorded on top of the from the calcite sample's protruding oxygen atoms bound to the carbonate groups which is expected to exhibit the strongest interaction with the negatively charged oxygen atom at the tip's front end; this force curve type I occurs strictly periodically as the tip very slowly scans laterally across the calcite surface. In water most likely that strong attractive interaction originates from hydrogen bonding, i.e. the two oxygen atoms exchange a proton, whose process's interaction forces are here directly measured. Force curve III shows absolutely no attractive interaction and repulsion only with the beginning linear rise in the AFM-force-versus-distance curve, stating that repulsive forces are not sensed until the tip is actual in snug contact with the sample—since this curve occurs irregularly this is interpreted to be the force curve with the tip exactly on top of a hydrated ion or water molecule being caught between tip and calcite surface's oxygen atoms, i.e. the electrostatic interaction is screened by one atomic scale particle between tip and sample. Further, the fact that the slope of the linear increase in this force curve type III abruptly switches to a shallower value exactly coinciding with the disappearance of all attractive force components account for an elastic particle (interaction) being caught between tip and sample here. Force curve II shows the AFM's force versus distance behavior observed most of the time when the tip is over any not really well-defined atomic sample surface position, this is interpreted as the interstitial sites on the calcite surface. While the tip is slowly moving sideways across the sample, these three types of force curves are observed periodically interchangingly—especially force curve I is strictly regularly repeating—thus representing the periodic atomic lattice of the calcite surface. These are direct measurements of the force interaction between two oxygen atoms interacting in an aqueous liquid, and thus representing direct measurements of hydrogen bonding forces and thus the dispersion and electrostatic forces which mediate these hydrogen bonds or even the onset of a covalent electronic orbital overlap.

Figure 5:
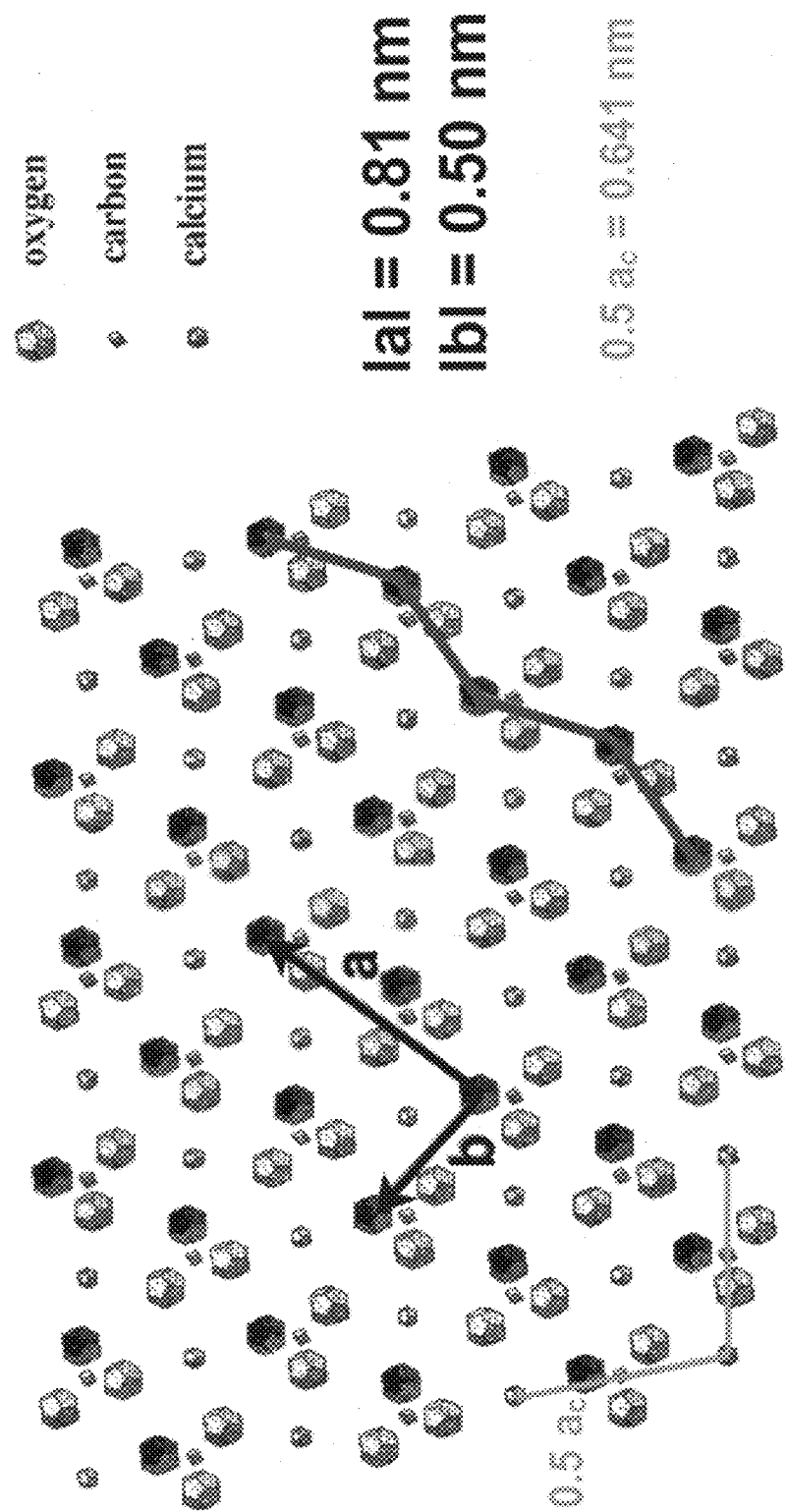
Figure 6:
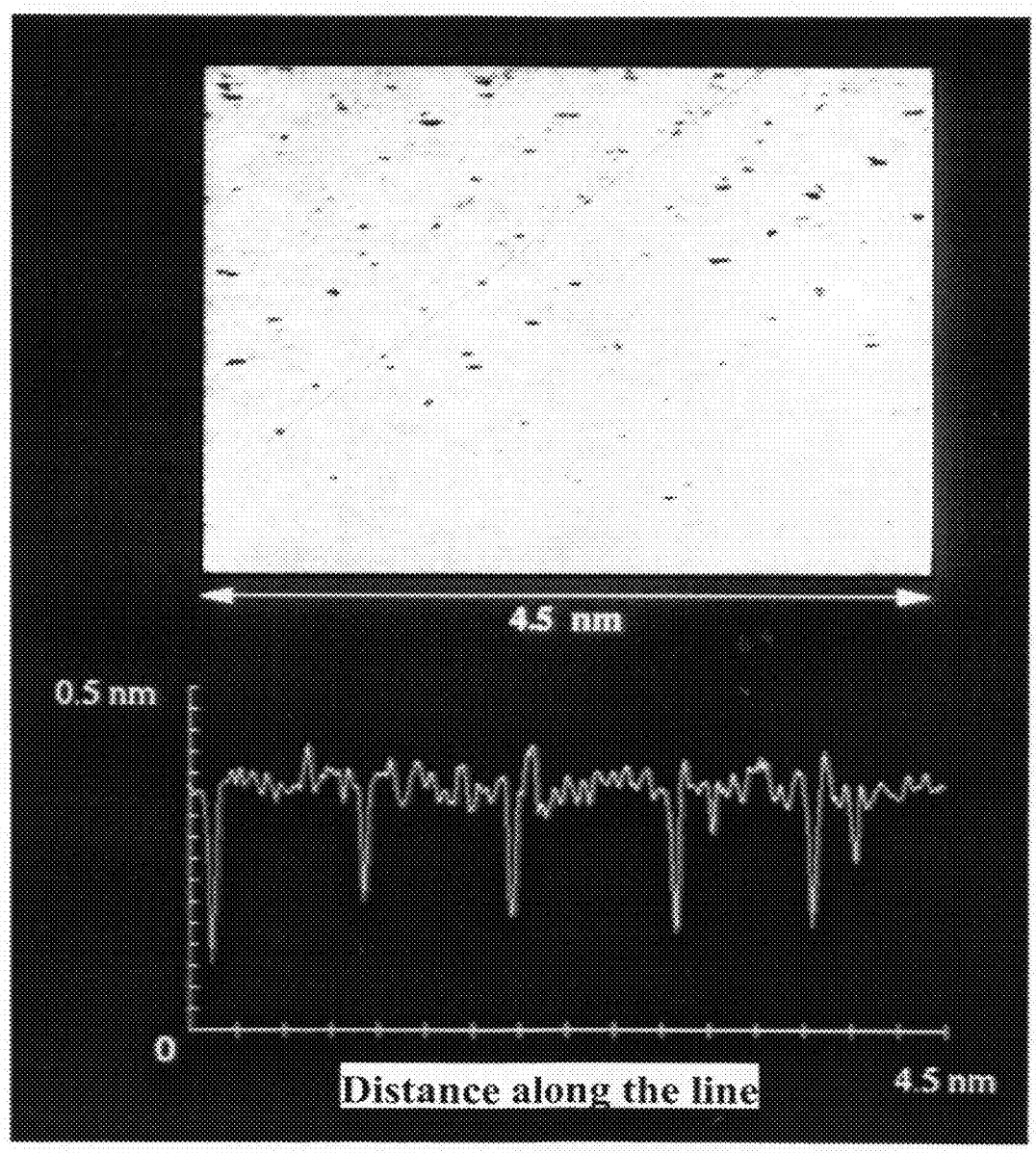

For completion and illustration of the next data, the crystal structure on a calcite (10$\bar{1}$4) surface is shown in FIG. 5 for whose production the crystallographic data were taken from [8] and were accordingly transformed into the calcite's (10$\bar{1}$4)-cleavage plane. FIG. 6 now shows an AFM image recorded in the AFM's so-called variable deflection mode at a working point in the force versus distance curve as indicated by arrow 1 in FIG. 3. Extremely sharp attractive force spikes are visible in the image, more clearly displayed in the line scan along the line as indicated in the picture, which are exactly within the locations of the oxygen atoms—the expected "zig-zag" structure of the oxygen atoms along lattice vector a is clearly visible. For illustration purposes, this line scan along that line in the picture of FIG. 6 is again redrawn in FIG. 7 along with a schematic illustration of the sample atoms/ions/molecules. For further illustration purposes, FIG. 8 shows the same image as FIG. 6, however now the model of the calcite cleavage plane of FIG. 5 is overlaid in the upper right corner of the picture showing only the protruding oxygen atoms in form of circles of roughly 100 pm (picometer) in diameter (≈oxygen atom diameter). There is even more such attractive force spikes visible than would relate to one spike per upstanding oxygen atom (protruding out of the crystal cleavage surface from one carbonate ion) on the calcite surface. Some are certainly related to the calcium ion positions and some may be related to hydrated ions intermittently firmly bound to the calcite surface or even to carbonate ions changing orientation or even position but in particular the frequently occurring double-spikes within the 0.1 nm circles indicating the protruding oxygen positions clearly demonstrate subatomic resolution by in fact looking into the atomic electronic orbitals of this protruding oxygen atom bound to the carbon atom and forming the carbonate ion together with 2 more oxygen atoms, one in plane of the calcite cleavage surface, one pointing below the cleavage plane; an atomistic model of the experimental situation is drawn in FIG. 9.

Further, these spikes are clearly much sharper than a typical atomic diameter of about 1 Angström clearly indicating the subatomic resolution capability of the AFM operated in the here described mode. Also those spikes do not always lie exactly at the centers of the said expected protruding oxygen positions but always lie within the approximately 1 Angström-diameter circles drawn at these positions in FIG. 3A of [1] (here reproduced in FIG. 8), besides the exceptions (calcium ions or loosely bound hydrated ions) mentioned right above. In particular it is noted, that there are such said double-spikes frequently visible, i.e. two such sharp attractive force spikes within the circles roughly indicating the diameter of this protruding oxygen atom. In the other cases, only one spike is seen at these oxygen locations. The interpretation here for seeing single attractive force spikes could be, that the AFM-tip would be "imaging"—sensing the maximum attractive forces in—the directions of the dangling bonds emanating from those said protruding oxygen atoms which are the origin of the hydrogen bonds formed with the oxygen termination of the front end of the tip. The slight statistics of the position of those peaks within the schematic oxygen atom "circles" in FIG. 8 clearly shows that these bonds sensed here by the AFM are truly dangling while the actually probing tip (orbital) always most likely remains the same since the true atomic unit cell is imaged correctly over very many image frames (for many minutes even—until the next "tip-crash" occurred); if this slight statistics in position was an imaging artifact due to a tip asymmetry, these spikes would all be in the same "corner" of those little circles roughly indicating the extent of an oxygen atom. However, since very frequently even double spikes of such sharply localized attractive tip forces are detected within the circles indicating the protruding oxygen atoms diameter, another interpretation may in fact hold true: This protruding oxygen atom is provenly (the complete unit cell of the calcite surface is correctly resolved even including the calcium ions) part of a carbonate ion, which ideally has three equivalent mesomeric (chemical resonance) states, where always one oxygen forms a covalent double bond with the carbon atom in the center and the other two oxygen atoms each form a single bond with the center carbon atom. Speaking in terms of atomic orbitals, the center carbon atom is $sp^2$-hybridized, while the two single bonded oxygen atoms are $sp^3$-hybridized and the one double bonded oxygen atom is $sp^2$-hybridized. Therefore these double spikes which are spaced smaller than 0.2 Angströms could be an actual image of the (backside of the) π-Orbital of the π-bond of the $sp^2$-hybridized protruding oxygen with one binding electron being in the "upper" half of that binding p-orbital, the other binding electron in the lower half—or it could be the two remaining sp2-orbitals each filled with a pair of 2 unbound electrons. On the other hand the single peaks could be originating from the dangling σ-bond (electron) of the now in an aqueous environment (very dilute calcium carbonate solution) occasionally $sp^3$-hybridized protruding oxygen—which is most likely to form a chemical hydrogen bond bridge to the negatively charged $sp^3$-hybridized oxygen atom at the tip, i.e. to the dangling σ-bond (electron) of the latter. Since at the calcite surface, the carbonate ion is not incorporated in a fully symmetric manner, the carbonate's mesomeric resonance will obviously not be fully symmetric either; perhaps on a calcite cleavage (10$\bar{1}$4) surface in UHV, the protruding oxygen would rather remain the double bonded $sp^2$-hybridized oxygen atom; however, if a tip is in close vicinity, the situation alters and since the tip is clearly experiencing local attractive forces as measured here, i.e. forming some sort of as yet at this stage ill-defined bond to this oxygen atom protruding from the calcite cleavage surface, and thus the mesomeric resonance equilibrium of the carbonate ion will again be shifted (even also in UHV), depending on the charge state of the tip. In an aqueous liquid, very likely the formation of hydrogen bonds to this protruding oxygen will shift the mesomeric equilibrium to this oxygen being $sp^3$-hybridized now and thus the dangling σ-bond (electron) will generate those single attractive force spikes. These two attractive force spikes of such a "double spike" are even much too close to each other (less than 30 pm apart from each other with every single spike being sharper than 10 pm, see FIG. 6-8) to represent simply 2 separately resolved oxygen atoms within one carbonate ion, as one C—O σ-bond bond length is 143 pm, one C═O double π-bond length is 122 pm and the averaged carbon to oxygen bond length in the mesomeric carbonate ion is 131 pm. Further, it cannot be excluded, that mixed orbital states including electronic orbitals of the tip and the sample atoms are formed here, but it is very unlikely that here a "subatomic" double tip as in [6] is responsible for those double spikes, since even such a small subatomic double tip would always generate the exact same "ghost-images" of each atom imaged, just like in [6]—not so here. Further, it cannot be ruled out, that those carbonate ions might rotate while remaining on their crystal positions (calcite is an ionic crystal, not a covalent crystal, while the tip-material—$SiO_2$—is a covalent "crystal").

Figure 10:
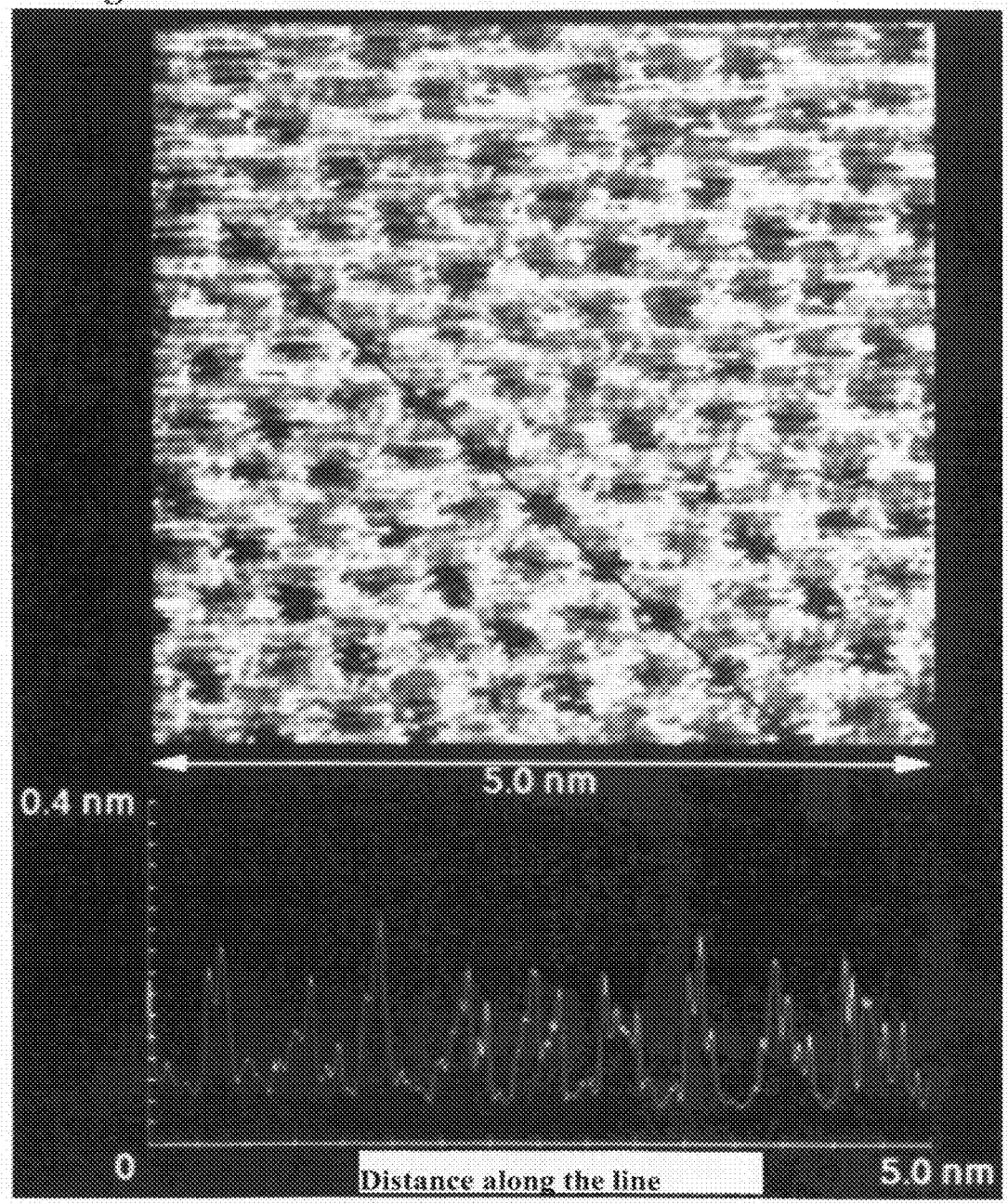
Figure 11:
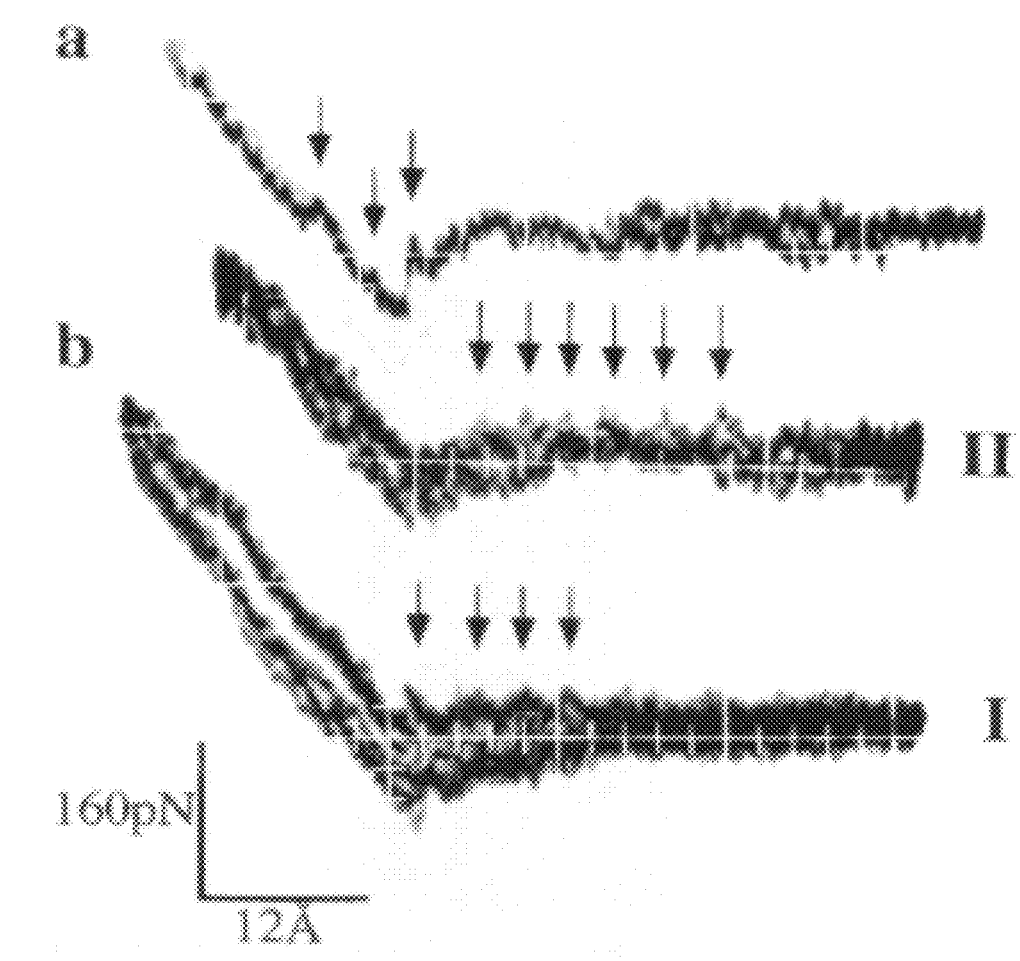

From the depth of these cantilever deflection spikes the magnitude of the interaction forces at the given working point (tip-sample distance at arrow 1) on the force curve in FIG. 3 can be directly and quantitatively read from FIGS. 6 and 4. FIG. 10 now shows the same image scan with the tip slightly closer to the sample surface (working point at arrow 2 in the force scan of FIG. 3); here also clearly the rectangular lattice of the upstanding oxygen atoms is revealed with two atoms per unit cell again clearly showing the pronounced "zig-zag" structure along lattice vector a, while however, here now, sharp attractive force spikes are not seen anymore, moreover the attractive "potholes" appear to be cut off at their bottom—obviously the front-most tip atom already touches the sample's protruding oxygen atoms momentarily on its lower excursion towards the sample surface. Upon approaching the tip even further towards the sample, those potholes become lesser and lesser deep, the zero-interaction level-line simply moves down just as expected. From such measurements, the actual distance of the front-most tip-atom from the sample surface can be extracted precisely, once the cantilever deflection is calibrated. This calibration usually is simply done by employing the z-scanner-piezo calibration, which is in turn often simply provided by the AFM-manufacturer usually using interferometry or obtained by measuring monoatomic steplines. But both calibrations can be erroneous since piezo calibrations can change over time and when imaging atomic steps, mono-atomic steps can be easily confused with double or multiple steps, unless really true atomic resolution at steplines is achieved which still is as yet rarely the case (see [9]). Thus a different z-deflection calibration method is proposed here described below in the context with measuring interatomic forces in liquids, thus measuring chemical bond forces directly:

Hence, for non-contact AFM, it is very important to be able to quantify the exact tip sample separation in the non-contact regime before the tip ever gets in contact with the sample, as even by a first touch, the sharp tip end might already be destroyed. Usually, the tip sample distance is calibrated via the z-piezo calibration by recording a force versus distance curve well into the repulsive regime, this way transferring the cantilever deflection calibration onto the z-(scanner)-piezo calibration, but as mentioned, this might already destroy a high quality probe tip, at least might contaminate it already. Thus, in a liquid, a new method is here presented using the oscillatory solvation forces and generally liquid molecule packing forces always present in a liquid. FIG. 11 now shows a force versus distance curve recorded by AFM in water on a calcite crystal. The (horizontal) non-contact part of this force curves show clear oscillations with a periodicity of roughly 3.2 Angstroms, which originate from packing effects of the liquid, here a very dilute solution of calcium carbonate. So the tip-sample distance can simply independently of AFM-instrument calibrations and in absolute values be calibrated by counting these oscillations like an atomic ruler for the z-position of the tip. Their periodicity will simply depend on the size of the dissolved ions or in pure water, it will simply be approximately the size of the water molecules (about 0.1 nm) in direction of their dipole moment plus the hydrogen bond length (0.18 nm). Of course, to avoid tip damage, these force curves then have to be gently driven into to the oscillatory solvation force regime just before the tip gets in contact with the sample. The same holds for hydrophobic liquids, where also oscillatory packing forces will arise between tip and sample upon tip sample approach. Oscillatory packing and solvation forces are well described in [5b, Israelachvili]. It is noted of course, to be precise, that the actual tip-sample separation is derived as relative sample position z plus cantilever-deflection/tip excursion s=force/$k_{spring}$ if the AFM's force curve is nilled in that way, that the zero force level corresponds to the lever deflection when far away from the sample and the origin of the force-sample position coordinate system is just that zero force level when the tip is in contact with the sample.

Figure 12:
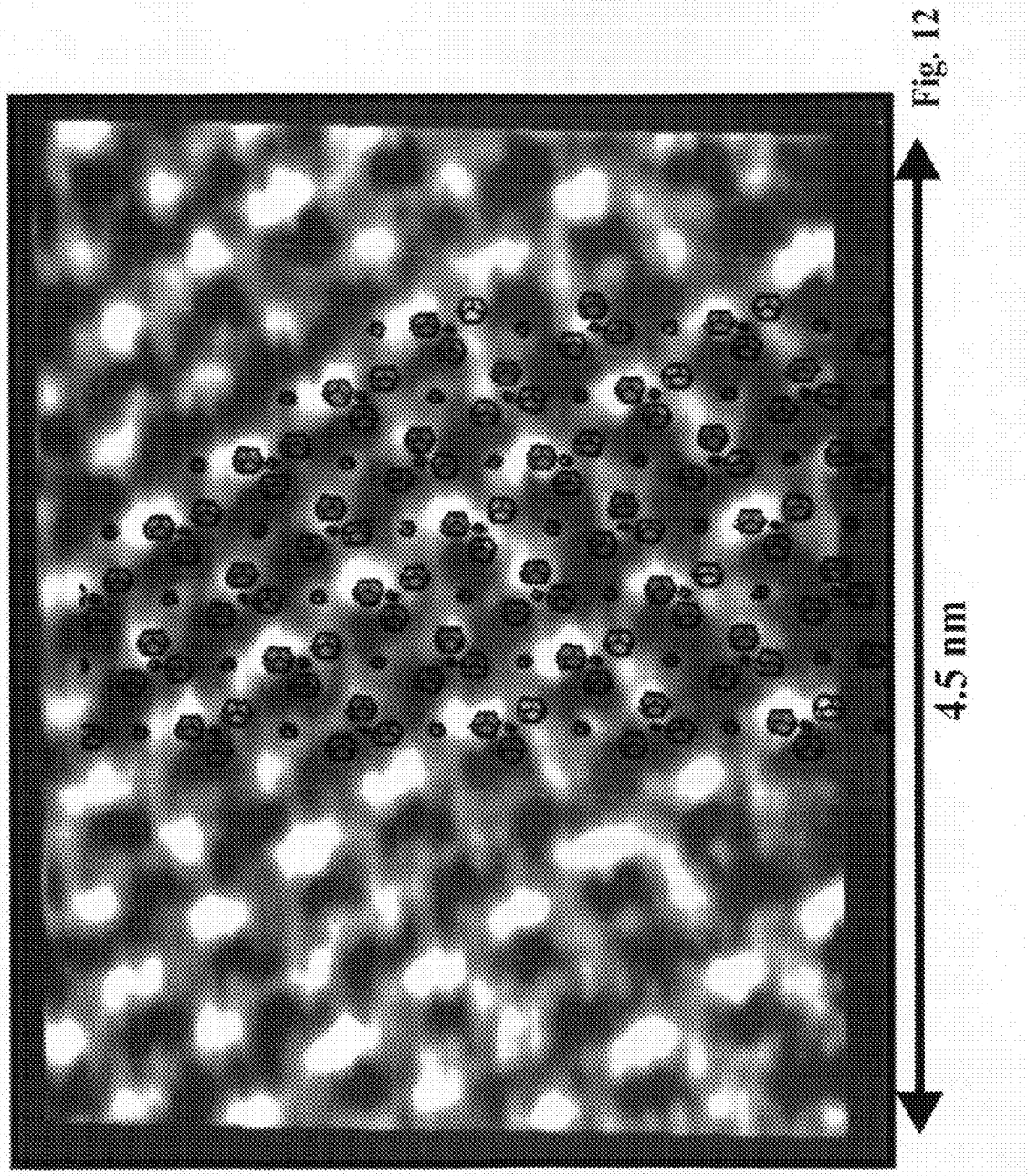

FIG. 12 (AFM image recorded in water at room temperature in variable deflection mode) now shows the complete lattice of a calcite surface showing both the carbonate ions' oxygen atoms protruding from the calcite surface and the calcium atoms in form of attractive force peaks. This AFM-image has been recorded just on the optimal working point of the force scan in FIG. 3 (arrow 3). Just for better visualization purposes here now the attractive force peaks were contrast-inverted which means that a bright spot here in this FIG. 12 is a location where the tip has been strongly attracted to the sample surface and a dark region here in FIG. 12 is a location on the sample where the tip has not been attracted to the sample surface. For illustration, the calcite surface structure model is included in the AFM image. It is again noted, that all grey values in this image are directly related to quantitative attractive forces which are acting between the specifically imaged and unambiguously identified sample atoms/ions (oxygen and calcium) and the front-most tip atom, also an oxygen atom carrying a negative partial or even formal charge as expected on a $SiO_2$-tip. This force quantification is only possible, because the tip has not jumped into contact to the sample surface in which case the tip atom would merely be probing the Pauli-contact repulsion forces and all the information about the attractive interaction force potential would be lost. Here, the tip is literally flying/hovering across the calcite lattice surface at a well-defined separation between the tip's front atom and the sample's atomic surface. This situation is again illustrated in FIGS. 7 and 13 which shows the schematic cross section of the tip "flying" across the sample's surface atoms schematically denoted by simple spheres underneath the actual data of the line scan from FIG. 6 redrawn.

FIG. 13 demonstrates plausibly why those attractive force spikes are so extremely sharp for the example of a charged tip electrostatically interacting with a dipole moment on the surface, which is most likely the dominating case on calcite: The reason simply is, that with decreasing separation between tip atom and opposing sample atom the attractive interaction force strongly increases even if only electrostatic forces (charge dipole force interaction proportional to distance$^{-3}$) were in effect.

Figure 14:
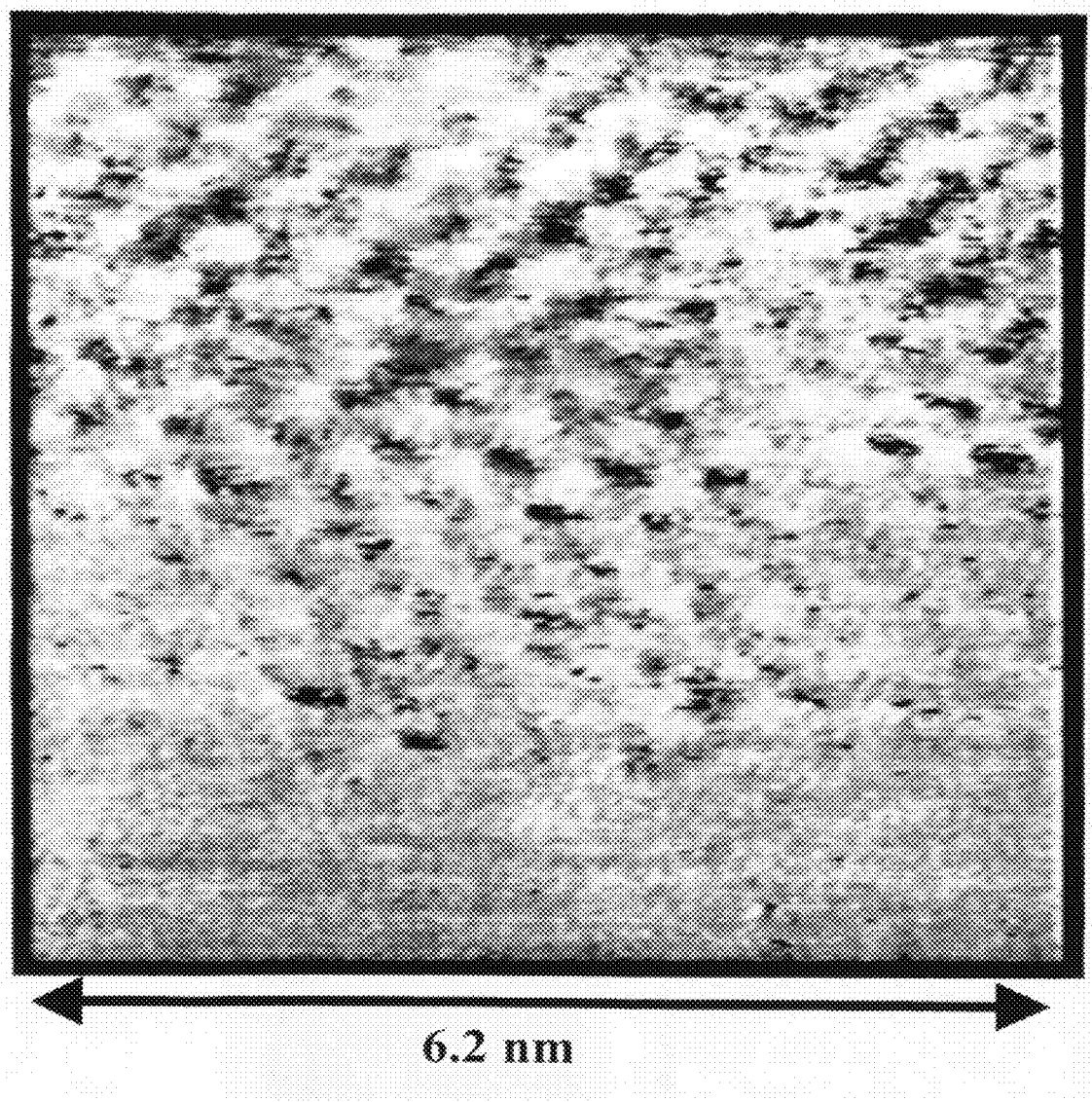

FIG. 14 shows basically the same image sequence as FIGS. 6/8, 10, 12—just integrated into one image frame where from the bottom of the image to the top the tip is gradually slowly approached towards the sample surface just like in the image sequence in FIGS. 6/8-10-12—on mica in 150 millimolar NaCl solution. This ionic solution is chosen just that all long range attractive forces are compensated, here now basically by the longer range double layer repulsion forces (Debye screening) but also by shorter range repulsion due to mono-molecular Stern-layers. The tip-sample separation is gradually decreased from the bottom of the frame to the top and on the bottom part of the frame such sharp attractive force spikes just like in FIG. 6 are recorded while towards the top part of the image frame, "potholes" as in FIG. 10 are recorded. Hereby, it is noted that the image grey-scale contrast has not been inverted, i.e. dark spots mean strong attractive forces, bright regions mean no attractive forces at all. Hereby it is further noted, that the single oxygen atoms of the "Si—$SiO_3^-$" "tetrahedrons" (with the Si $sp^3$-hybridized) on each corner of the mica's honeycomb surface structure are probably not resolved here. Instead, it is known that upon cleaving mica, usually the "holes" of the honeycomb's hexagons are filled with potassium (K+) ions which may here in NaCl-solution be replaced by the natrium (Na+) ions which most likely are partially hydrated by hydroxyl ions and thus a similar situation arises as on the calcite surface.

Standard AFM force calibration methods simply use the spring constants as provided by the AFM cantilever manufacturer, but these can be off easily by an order of magnitude since the thickness of the thin films which the cantilevers are fabricated of can vary significantly and by far not every cantilever is calibrated, at most wafer-wise one or two cantilevers are test-measured and then only the resonance frequency is measured, which does not directly lead to the spring constant as the thin film material's elastic properties can vary significantly too. But when performing AFM-measurements, an in situ force calibration method can be employed, just like employed in GB1012395.8:

$CaCO_3$ occurs in 2 different crystal structures which is the well known calcite structure and the lesser known aragonite structure. The (10$\bar{1}$4)-cleavage planes of calcite exhibit an atomic lattice of oxygen atoms on the "uppermost" surface, which is a rectangular lattice with lattice constants 8.1×5.0 Angströms, where the Ca-ions and the carbonate-"tri-stars" are arranged in a rhombic lattice of lattice constant 12.82 angströms and an angle of 101.9° [8].

In contrast, the aragonite structure exhibits an hexagonal lattice with lattice constant 5.8 Angström on the "uppermost" surface of the (001)-cleavage plane [8].

Figure 15:
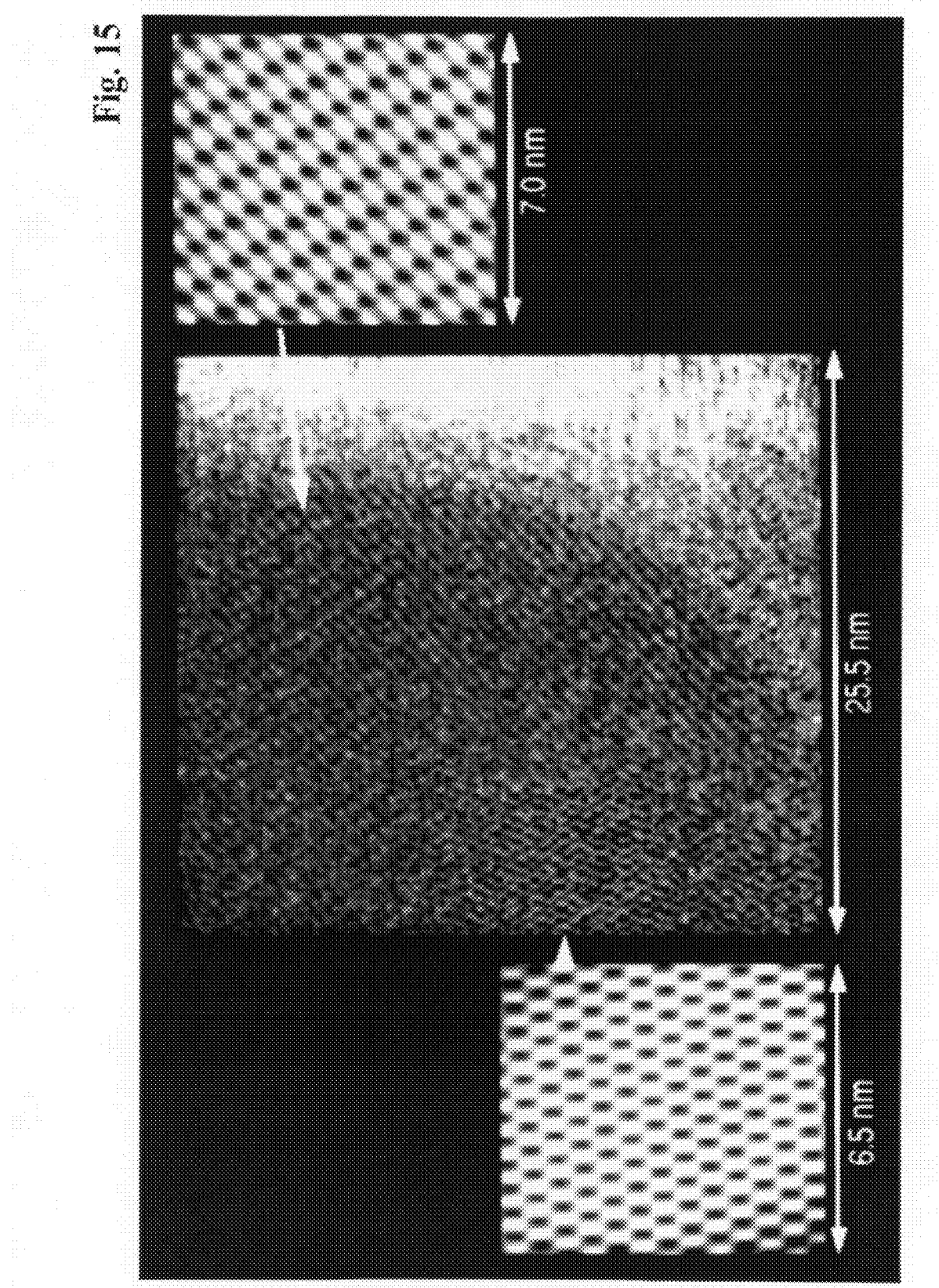

FIG. 15 now shows an approximately atomically resolved AFM-picture of a calcite crystal's cleavage plane, recorded in water at room temperature (here about 20°-23° Celsius). The expected rectangular lattice structure (lattice constant 8.1× 5.0 Angström) of the oxygen atoms is recognizable almost in the whole image, however with an exception: In the lower left quadrant there is a clearly visible hexagonal lattice having a sharp boundary with a lattice constant of 5.0-5.5 Angström, which—within the calibration tolerances of scanning force microscopy—corresponds well to the 5.8 Angström of the aragonite crystal structure. The tip's loading force of the force microscope for this image is roughly of order $O(1) \times 10^{-11} N$, as is shown in an AFM's so-called force distance curve (FIG. 3, arrow 4): The working point for this image lies just closely on the left side of the minimum of the curve (arrow 4). Simply speaking the point of inflection on the right side of the minimum of the force versus distance curve roughly corresponds to the zero loading force $0 \times 10^{-11} N$ of the front-most tip atoms, whereas closely on the left side besides the minimum (arrow 4), where stable imaging in feedback mode is possible [1], the repulsive load on the front-most tip atoms amounts then to roughly 1 to a few $10^{-11} N$. The latter is explained in detail in [1]. Furthermore, it is known [10], that at a pressure of roughly 6 kbar at a temperature of roughly 20° Celsius, the $CaCO_3$ can undergo a phase transition from the calcite to the aragonite structure initiated by the (large) pressure, which has most likely occurred here and was observed in situ, since: At the interaction surface area of size of one tip atom (roughly 1 Angström) 6 kbar would correspond to a tip loading force of roughly $6 \times 10^{-12} N$, at an interaction surface area of a few tip atoms ($Si/SiO_2$, roughly 10 Angström$^2$) which is—as concluded from the lateral resolution obtained—likely here, these 6 kbar correspond to a loading force of $6 \times 10^{-11} N$, hence is of an order of magnitude of $O(1) \times 10^{-11} N$. This thus means, that the here for the scanning force microscopy used imaging forces correspond coincidentally roughly rather exactly to the pressures, which are necessary to induce the phase transition of the calcium carbonate from the calcite to the aragonite crystal structures. The value of 6 kbar from [10] of course also is only an error prone averaged (dependent on the measurement procedure) measure, but a physical phase transition always occurs at the exact same pressure and temperature, depending on the underlying theory (Landau theory of phase transitions [11]). Often, there is pressure ranges—for interacting gas particles, i.e. real gases, especially for 2-dimensional crystals—across which a phase transition occurs, namely especially if in contaminated systems several/many (re-)crystallization cores originate and the crystal grows or melts slowly across a whole pressure and/or temperature range. Here in FIG. 15 it is in fact in 2 dimensions looked into a tiny crystallization core (roughly 100 atoms), thus this core most likely has originated instantaneously, because if this core would have slowly originated in turn from (even smaller) single crystallization cores, it could have only been single atoms.

Hence, it is assumed here, that this aragonite core surrounded by a calcite lattice has instantaneously originated at the here present tip loading force of roughly $O(1) \times 10^{-11} N$ at room temperature (roughly 20° Celsius) and thus, this phase transition process represents a pressure standard for the here for this measurement used specific probe tip geometry, which cannot be superseded in terms of accuracy, just is very difficult to be evaluated quantitatively, but can be perfectly used as a comparative measure (i.e. a pressure standard for AFM).

Since it is very difficult, to "catch" just this phase transition from calcite to aragonite during the force microscopy imaging, in GB1012395.8 an alternative is furthermore suggested for the standardization of the tip loading forces. This method is less accurate, since 2 processes are mixed, namely the (in the case of calcite very slow) crystal dissolution process of the $CaCO_3$ in water in equilibrium and the here exploited pressure induced abrasive process of single (atomic) crystal steps.

Figure 16:
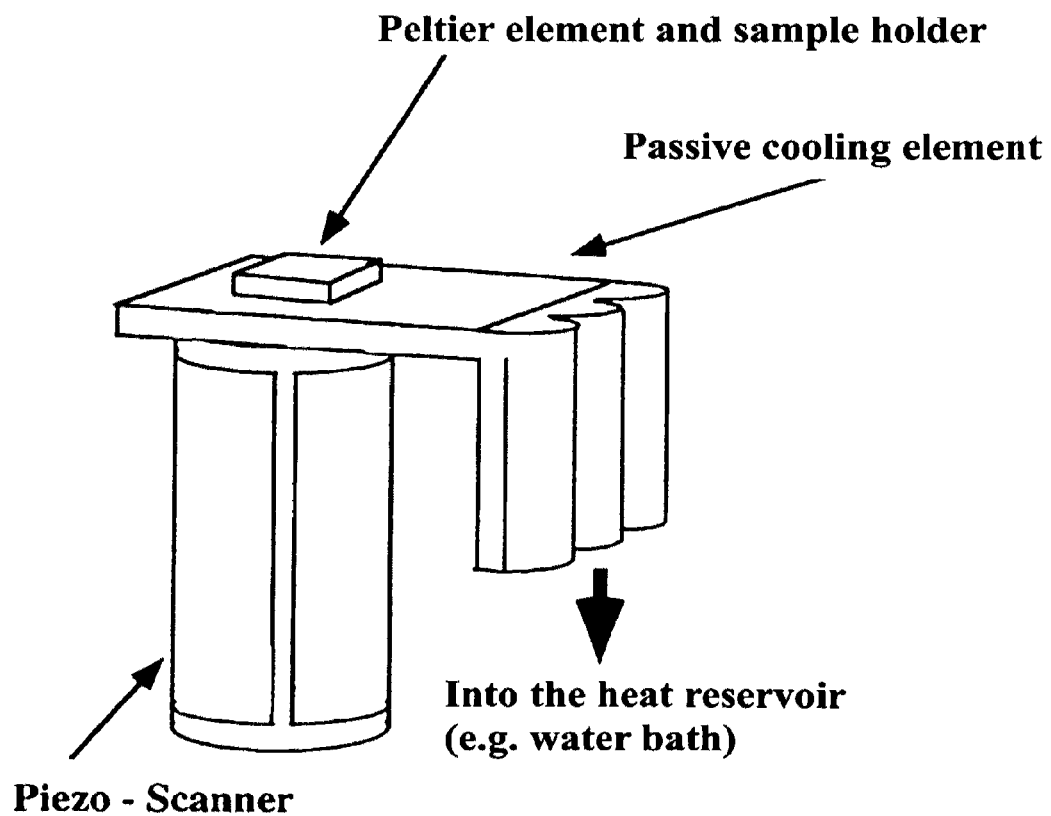

Furthermore, for reliable and reproducible in situ calibration of the AFM, the sample and the tip and sample immersing liquid has to be temperature controlled as sketched in FIG. 16. This is here realized by mounting a passive cooling element onto the scanner piezo and by mounting a temperature controlled Peltier-element onto this passive aluminum cooling element, which in turn serves directly as a sample holder. The passive cooling element is formed in a way that it can be partially immersed into a large heat reservoir filled with liquid. Hence, the liquid heat bath provides the course temperature setting with large heat capacity, thus this course temperature setting remains constant over long periods of time and or is regulated with very slow time constants and very small temperature amplitudes. The more accurate and active and fast temperature control is then done using the Peltier-element whose heating or cooling current is feedback-controlled through the temperature-proportional signal of a minute thermo couple mounted in direct vicinity of the AFM-cantilever, while the excess heat from the back side of the Peltier element is dumped into the large liquid heat bath thus keeping temperature changes away from the scanner piezo. Since parts of the passive cooling element reach through the surface of the liquid in the bath during scanning, the surface tension of the liquid in the heat bath has to be eliminated, which is realized by selecting a proper liquid having large heat capacity and small or no surface tension. Even water can be used, if a monomolecular surfactant-, lipid-, oil-, alkane-, alkanol-layer is spread on the water-air interface, otherwise, when using water with its high surface tension, large vibrations would couple into the scanner piezo and then perturb the scanning at small amplitudes for atomic scale AFM-imaging.

The here in the presently invented measurement procedure revealed strongly localized interatomic attractive forces can of course also be employed for imaging contrast generation, most easily in variable deflection mode as shown in [1] and here. However, when using rather soft cantilever springs, these attractive force spikes are rather steep and thus it is—especially in a liquid—rather difficult to maintain a stable feedback control in order to obtain calibrated—via the z-calibration of the scanner piezo—height information and last but not least an efficient drift compensation. In UHV, as mentioned above, the method of choice is frequency demodulation technique, where resonance frequency shifts of the vibrating cantilever spring as the tip raster-scans laterally across the sample surface are locally recorded which are a function of the local interaction force gradients, while a feedback loop holds the resonance frequency shift constant. This method in UHV provides very good constant interaction images but is very difficult in a liquid due to drastically reduced Q-factors of the cantilever spring resonating in the liquid-damping and various disturbing side effects like the "forest of (acoustic) peaks" in the spectrum of such an AFM-cantilever vibrated in a liquid [12], although true atomic resolution was nevertheless claimed in [4] using this technique in water.

Figure 17:
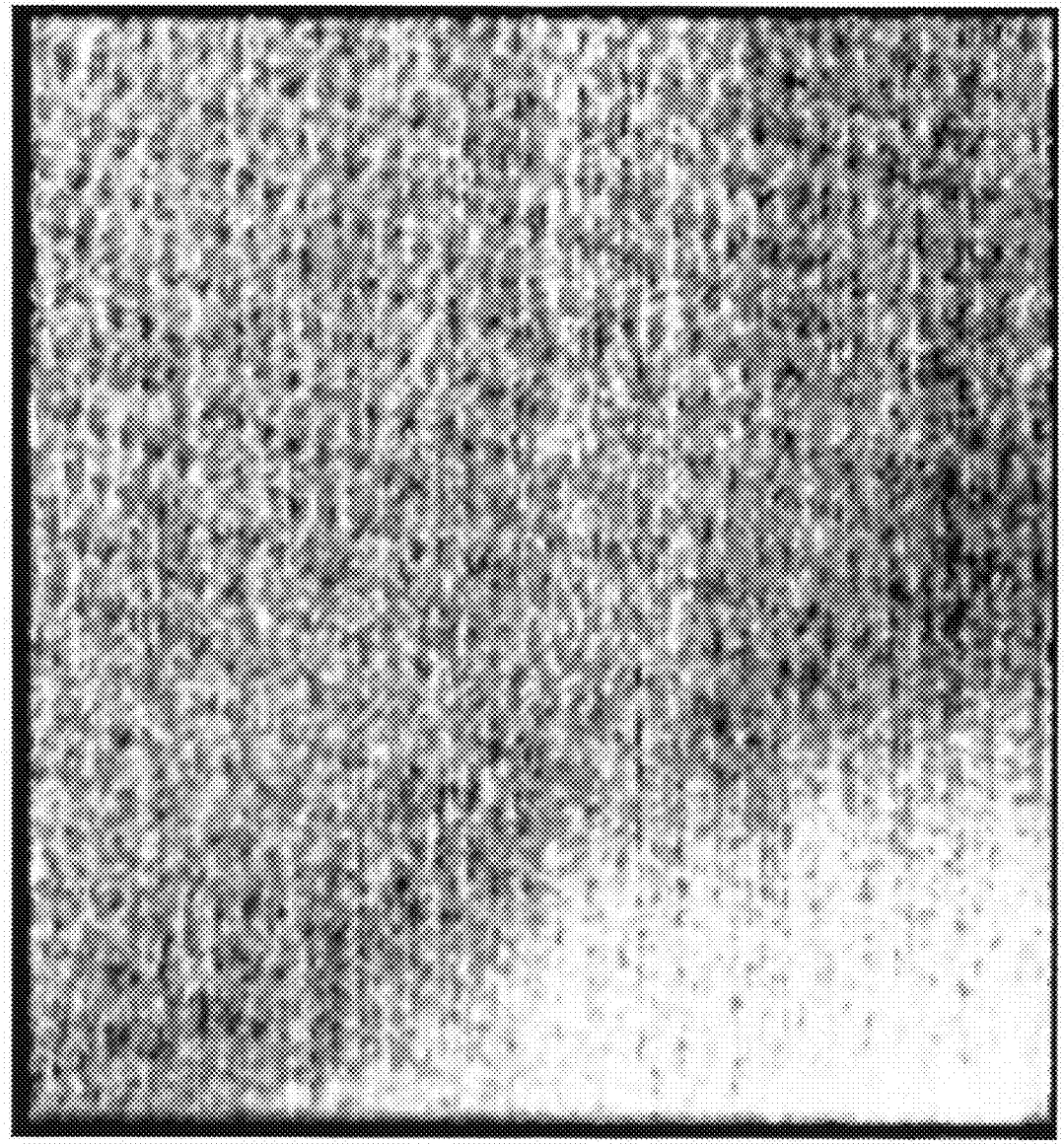

Simply imaging in variable deflection mode without any feedback height control is well possible as shown in [1] and here but when trying to image more corrugated surfaces than an atomically flat crystal surface, e.g. even a mono-atomic stepline, the non-contact variable deflection technique runs into its limits as seen in FIG. 17, where a monoatomic stepline is indeed imaged, however on the lower terrace (right side of the image) attractive contrast is in effect showing the protruding oxygen atoms as dark spots while on the upper terrace (lower left side of the image) already repulsive contrast is in effect, the terrace indeed is shown brighter than the lower terrace and the protruding oxygen atoms appear here as bright spots.

Figure 18:
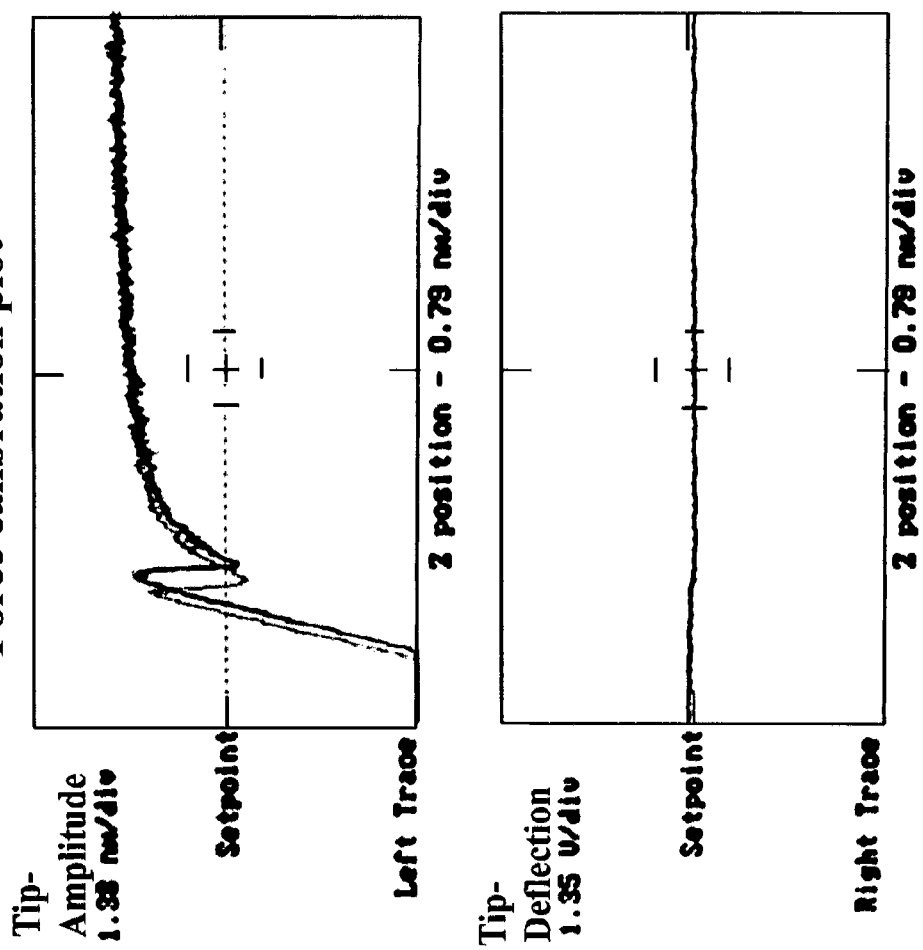

Here now, a slightly intricate procedure is shown, in order to achieve true atomic resolution by a dynamic force AFM technique which allows a stable feedback control (i.e. allows for constant interaction and thus height calibrated images) in a liquid in the non-contact regime:

It was found, upon approaching a vibrating cantilever towards a sample surface both submersed in a liquid, that just before the tip touches the sample and the cantilever vibration is clamped down and thus stopped, there is a slight and gradual increase in vibration "amplitude" visible, just before the tip is in hard contact with the sample and thus the vibration breaks down completely (FIG. 18). This has the following reason: Here, the so-called laser beam deflection technique is used to detect the cantilever motion, which primarily measures the slope/the angular motion of the cantilever at the spot where the laser beam is reflected off rather than the actual amplitude of the tip excursion. Therefore, once the tip reaches into that non-contact regime where it senses these strongly localized attractive forces, the cantilever begins to gradually be clamped down at its tip end more and more the stronger these attractive tip-sample forces become. Thus the amplitude of the detected angular motion in form of the here detected first order harmonic vibration of the cantilever increases until the tip actually touches the sample surface; then also the first harmonic of the cantilever spring is clamped since then the cantilever motion would have to pivot around the very end of the rather long tip (5 µm versus 60-100 µm cantilever length) which now sits on the sample—only the much higher order harmonics could now be excited, which are so much stiffer that they don't contribute and then the measured amplitude as put out by the software of a commercial AFM is roughly zero. The feedback control can now be acting on this gradual increase of the cantilever "amplitude" (angular motion!) and stable constant interaction forces with true or almost true atomic resolution are achieved (FIGS. 19, 20, 21, 22), where regular electronics of a commercial tapping mode AFM can be employed, however, obviously the feedback response sign has to be inverted as compared to regular tapping mode AFM. This is why, this here presented technique is called "inverted non-contact tapping mode AFM." The non-contact feature is ensured by the fact that the AFM is operated in a regime, where the amplitude is still gradually increasing—how would that be possible if the tip were touching, then there could only be a jump in angular "amplitude" of the intrinsic first harmonic, not in the acoustic modes of the liquid cell—the other commercial dynamic force AFM methods in a liquid are rather "blind" and automated methods, where it is never known for sure, whether the tip is actually touching or not, since as shown, even repulsive force AFM images can give true atomic resolution as shown in [1] and when the tip is touching the sample and thus clamping the cantilever vibration, even then lots of stray signals can still be picked up. It is emphasized, that the working frequency at which the cantilever is vibrated does not necessarily have to be an intrinsic resonance of the cantilever spring, many of the acoustic peaks in the "forest of peaks" [12] defined by the cantilever properties and the acoustic properties of the liquid cell will do.

Ultimately it is proposed to install 2 separate but coupled feedback loops (FIG. 23) where a first z-feedback is acting with very short time constant response time on the (small) drive signal amplitude of the cantilever vibration while sensing the cantilever's instantaneous "slope" amplitude and thus is maintaining this "slope" amplitude constant in this amplitude demodulation scheme in this "inverted" tapping regime where higher sample features will cause the tip amplitude (in fact, the said cantilever's "slope" amplitude to be precise) to increase as opposed to regular tapping where it would obviously decrease; simultaneously, a slow but large travel z-("DC"-)feedback is acting on the actual sample-z-position while sensing the cantilever's average deflection and retracting the sample as usual in constant height AFM when a higher sample feature is moving underneath the tip. The "art" now is to be able to run these two coupled feedback loops simultaneously in a stable manner.

Further, it is hereby generally noted that amplitude demodulation technique for dynamic force AFM is suited for rapid imaging or for still reasonably rapid imaging at low Q-situations, which is always the case for AFM in a liquid where cantilever resonances are always strongly damped (Q-factors of order 1-100, depending on cantilever size, intrinsic resonance frequency and crystal material properties). Of course, in a high-Q situation such as AFM in UHV where the cantilever can reach quality factors of up $10^6$ and more, the more sensitive but slower frequency demodulation technique is the method of choice. But I am still doubtful, that purely frequency demodulation detection technique of an AFM is applicable in a liquid at all without mixing with all kinds of stray signals from average cantilever deflection and unexpected amplitude modulation, unless extremely stiff cantilevers/oscillators are used having resonance frequencies in the 1-100 MHz regime and thus cannot be much influenced by the liquid damping; but their spring constant will be much higher than the value of order 100 N/m as commonly used in FM-AFM.

FIGURES

FIG. 1: Short-, medium- and long-range force components acting on an AFM tip—simple model schematic.

FIG. 2: Atomistic model SiO2-tip—calcite sample in water (very dilute calcium carbonate solution) with Stern- and Helmholtz-layers of adsorbed hydrated ions and water molecules respectively.

FIG. 3: Sample site averaged AFM-force-versus-distance-curve—the force curve has been recorded slowly (about 1 sec per cycle) while the calcite sample is scanned laterally at regular imaging scan speeds.

FIG. 4: Force versus distance curves recorded with atomic lateral resolution—these force curves were recorded at a high cycle rate (about 50 Hz) while the lateral scan was almost stopped or moved extremely slowly along a line at about 5-8 Angströms per 1-2 seconds.

FIG. 5: Model of the (1014)-cleavage plane of a calcite crystal. The oxygen atoms protruding out of the calcite cleavage plane a filled black.

FIG. 6: The oxygen atoms protruding out of the calcite cleavage plane imaged by AFM with sub-molecular resolution using purely attractive imaging forces acting between front most tip atom and sample atoms. Bottom part of the figure shows a line scan along the line drawn in the picture, pronouncing the sharpness of those attractive peaks. The AFM-working point is at that place on the force versus distance curve in FIG. 3, which is indicated by arrow 1.

Figure 7:
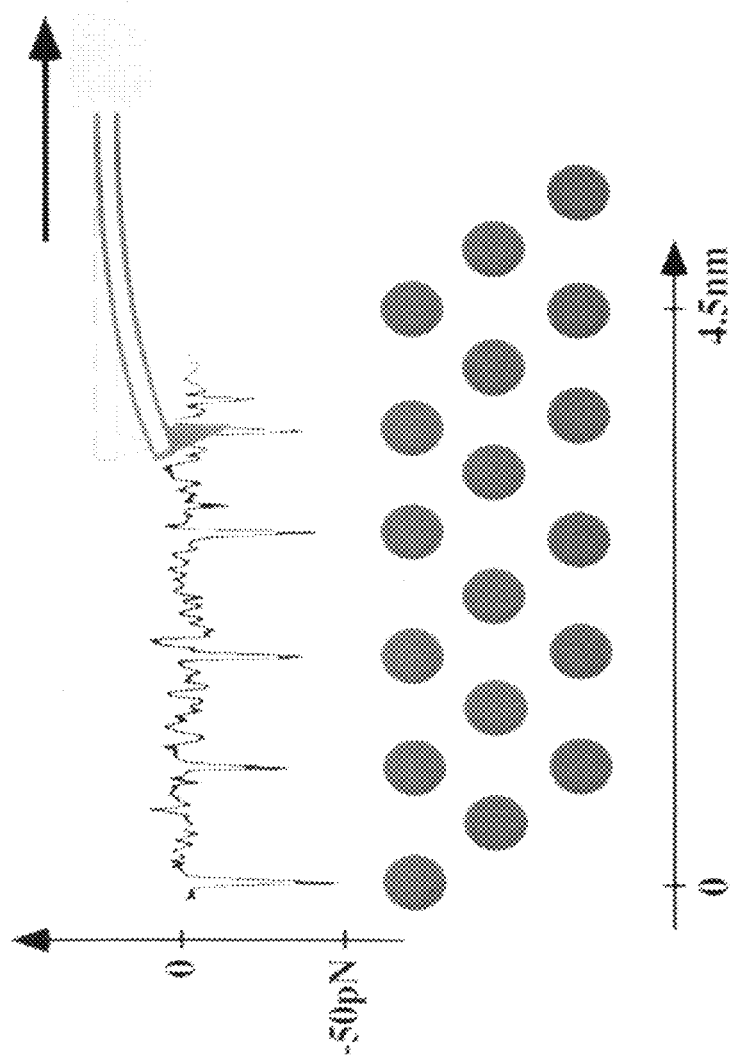
Figure 8:
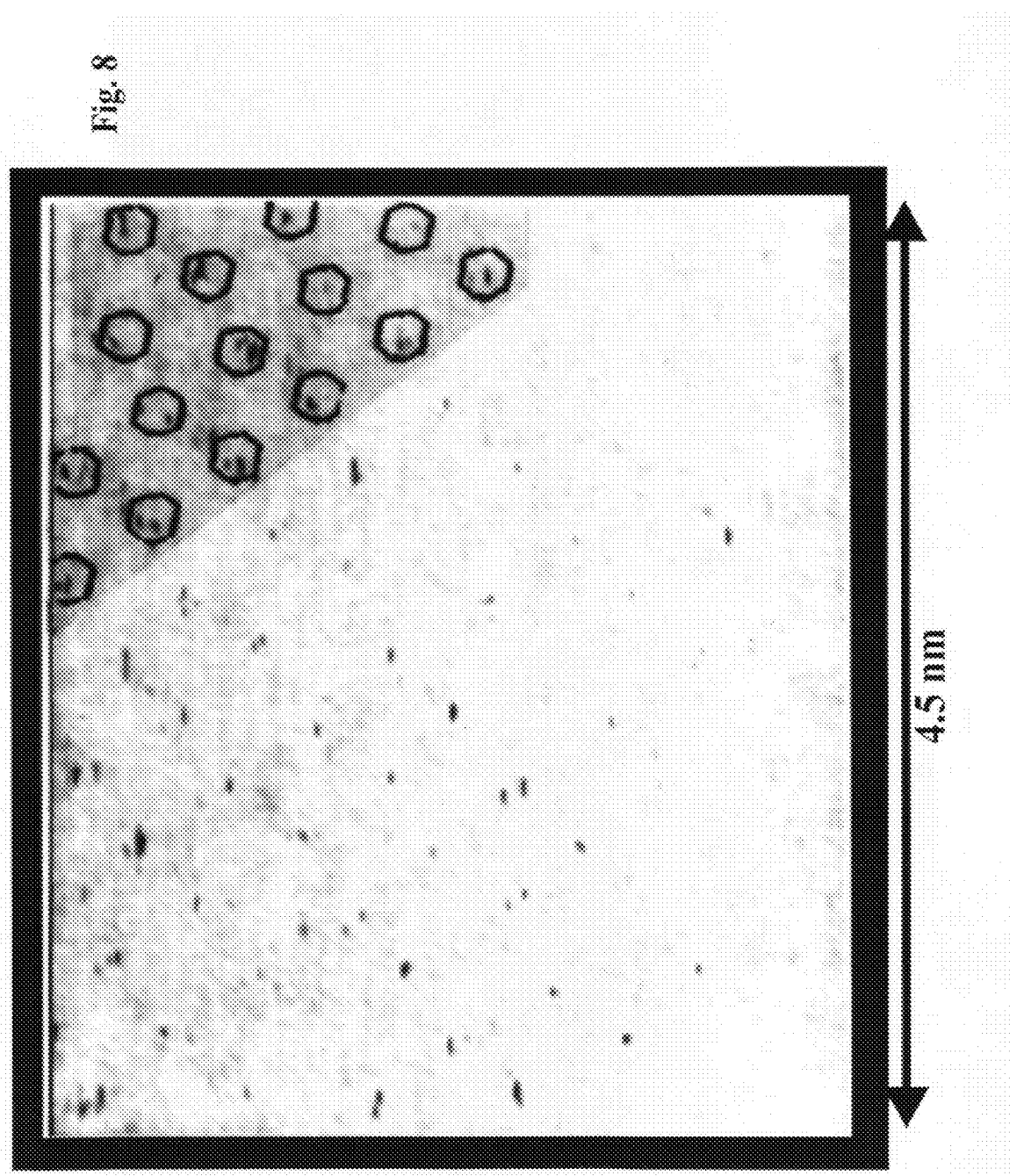

FIG. 7: The line scan of FIG. 6 redrawn in a schematic pronouncing the fact that the imaging tip atom is actually flying/hovering above the surface.

FIG. 8: The same picture as in FIG. 6 just with the calcite model of FIG. 5 transparently overlain in the upper right corner of the frame, only showing the protruding oxygen atoms as circles with a diameter of roughly 100 pm.

Figure 9:
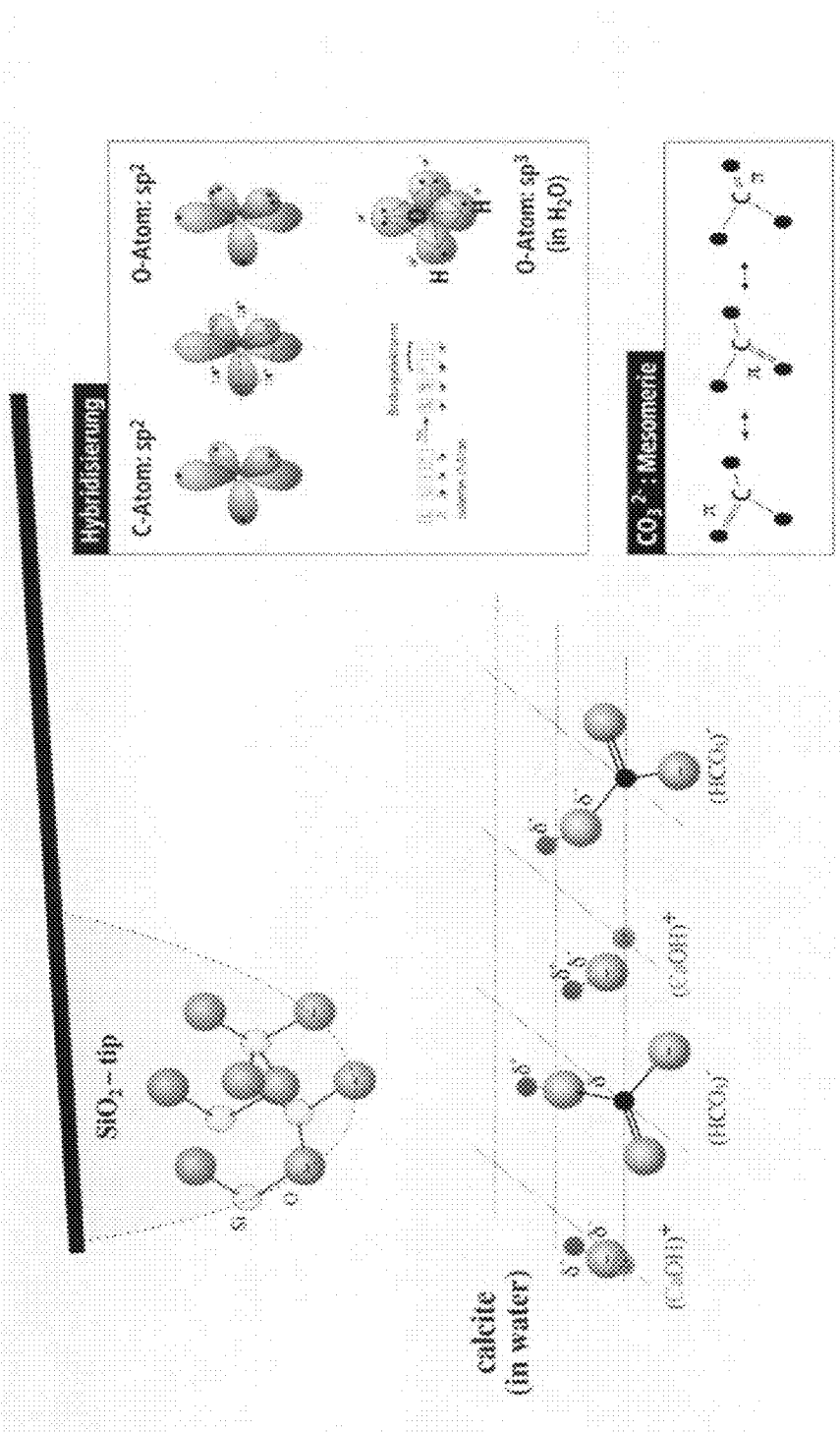

FIG. 9: Atomistic model of the situation of a $SiO_2$-tip opposing the calcite ($CaCO_3$-1014)-cleavage plane, where the hydrated ions in solution—as shown in FIG. 2—are left out. Inset: Orbital-model of the mesomeric carbonate-ion states, especially the $sp^2$ respectively $sp^3$-hybridization of the oxygen atoms.

FIG. 10: As FIG. 6, just with the tip slightly more approached towards the sample surface as indicated by arrow 2 in FIG. 3.

FIG. 11: Force curves at recorded at rapid cycle rates with the lateral sample scan switched off; clear periodicities in the cantilever deflection (tip excursion) are visible far out in the non-contact regime.

FIG. 12: AFM image of the calcite cleavage surface at true atomic resolution, mainly showing the said protruding oxygen atoms of the carbonate ions and also the calcium ions as is clearly seen in the overlain calcite 1014-plane model. Hereby, it is noted that for illustration purposes in this image the contrast display has been inverted as compared to the other images FIG. 6, 8, 10, hence here in FIG. 12 bright spots are localized positions on the sample surface where the tip has been attracted to towards the sample surface, dark areas correspond to sample locations where no or little attractive forces were sensed by the front atom of the tip—this is vice versa as compared to usual AFM images for instance in contact mode, where up is up so to speak. The working point on the AFM force curve is as indicated by arrow 3 in FIG. 3.

FIG. 13: Mechanistic model corresponding to FIG. 9, where a force estimation is shown, making those extremely sharp attractive force spikes plausible at the positions of the said protruding oxygen atoms:
Plausibility of the sharpness of the „attractive force spikes:
$\partial F/\partial z \lesssim k$
Assumption: charge-dipole interaction: $F_{q-u} \propto 1/\epsilon * q*u/r^3$, where q=1e, u≈1.6 D, $\epsilon_{H_2O}$≈10 (at close separations)
Assumption $F \propto 1/r^3$ is conservative because:
shorter range interactions contribute at close distances
$\epsilon(H_2O)$ is distance dependent at very small separation
partial screening by hydrated ions may increase with distance FIG. 14: AFM image of mica in 150 mM NaCl-solution, where the tip is gradually approaching towards the sample surface from the bottom of the image to the top; here again, the grey-scale representation is not inverted just like in FIGS. 6,8,10, i.e. dark spots correspond to atomic positions on the sample where the tip gets locally strongly attracted towards the sample.

FIG. 15: Regular constant-height AFM image of calcium carbonate in water recorded using repulsive imaging forces acting on the tip's front atom with working point on the force curve as indicated by arrow 4 in FIG. 3: A coexistence of the calcite (rhombic) and the aragonite (hexagonal) crystal structures is clearly visible on the $CaCO_3$ surface.

FIG. 16: Temperature-controlled sample scanner for a scanning probe microscope.

FIG. 17: AFM image of a stepline on calcite, where on the lower terrace, the atoms are detected with attractive forces—the dark spots again resemble the well-known rhombic lattice zig-zag structured unit cell formed by the said protruding oxygen atoms; however on the upper terrace, the atomic positions are recorded with repulsive forces, the aid oxygen atoms show up as bright spots. The greyscale representation here is again non-inverted, bright means lever is deflected upwards, dark means lever is deflected towards the sample.

FIG. 18: Cantilever amplitude versus distance curve and average lever deflection versus distance curve as measured on calcite in water; the typical AFM-force curves in tapping mode AFM, with one important difference: Just before the lever amplitude breaks down when the tip gets in snug contact with the sample surface, the measured cantilever (slope) amplitude increases rather sharply but continuously (i.e. without instability).

FIG. 19: Non-contact dynamic force microscopy (inverted tapping mode) constant-height image of a calcite surface on larger scale (A) screw dislocation) and on the atomic scale (B) grain boundary). Here, the control parameter for the constant height feedback loop is just this amplitude increase in the non- or "weak"-contact regime while the feedback response is inverted as compared to regular tapping mode AFM. I.e. here, the feedback retracts the sample when the amplitude is increasing locally—vice versa as compared to usual tapping mode, where the feedback retracts the sample upon lever amplitude decrease. Here in this constant-height image, again, bright spots correspond to protruding sample locations, dark spots correspond to depressions on the sample—i.e. completely regular grey-scale representation.

Figure 20:
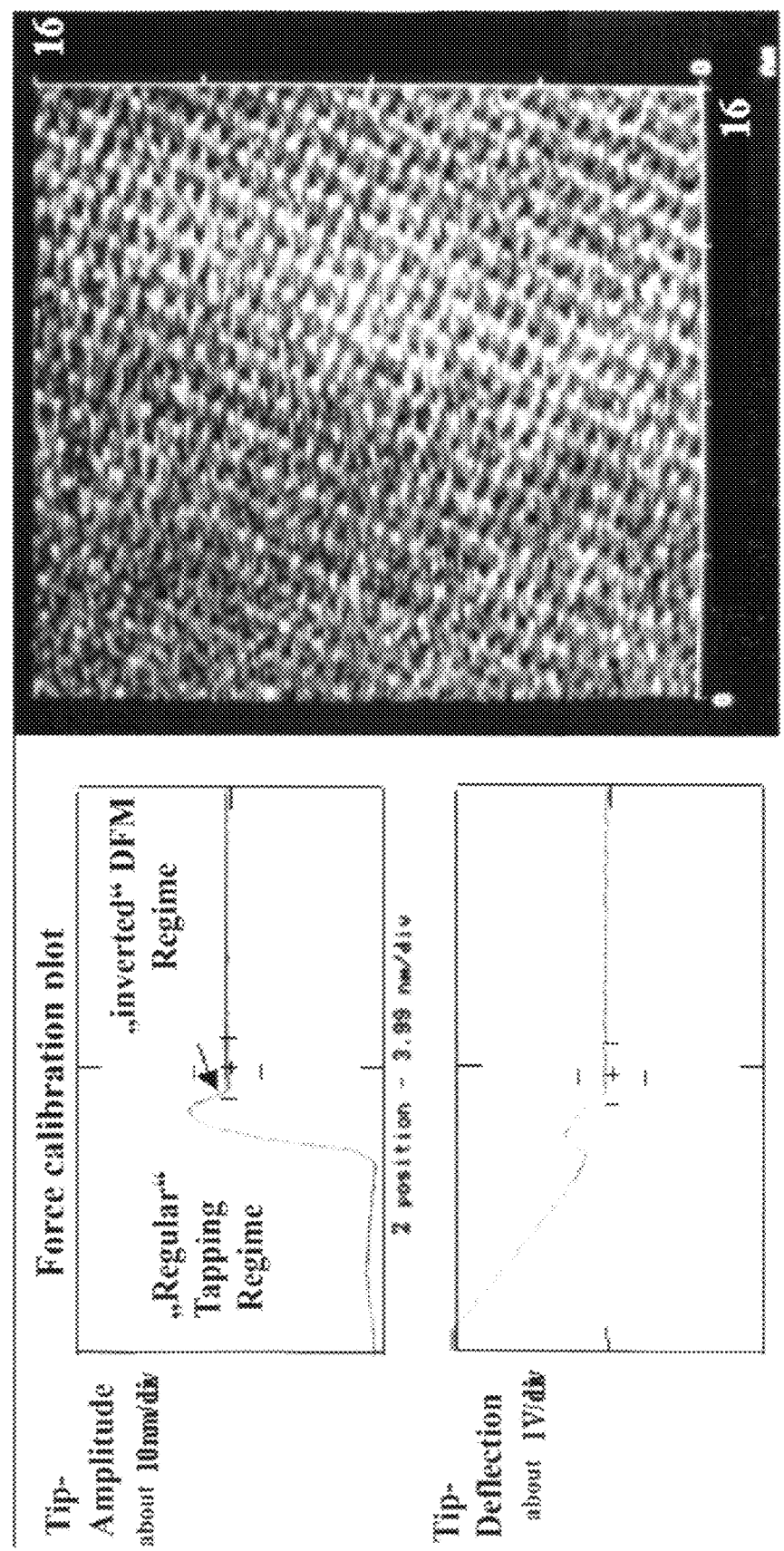

FIG. 20: Essentially the same content as FIGS. 18 and 19, the data were just recorded with a different instrument.

Figure 21:
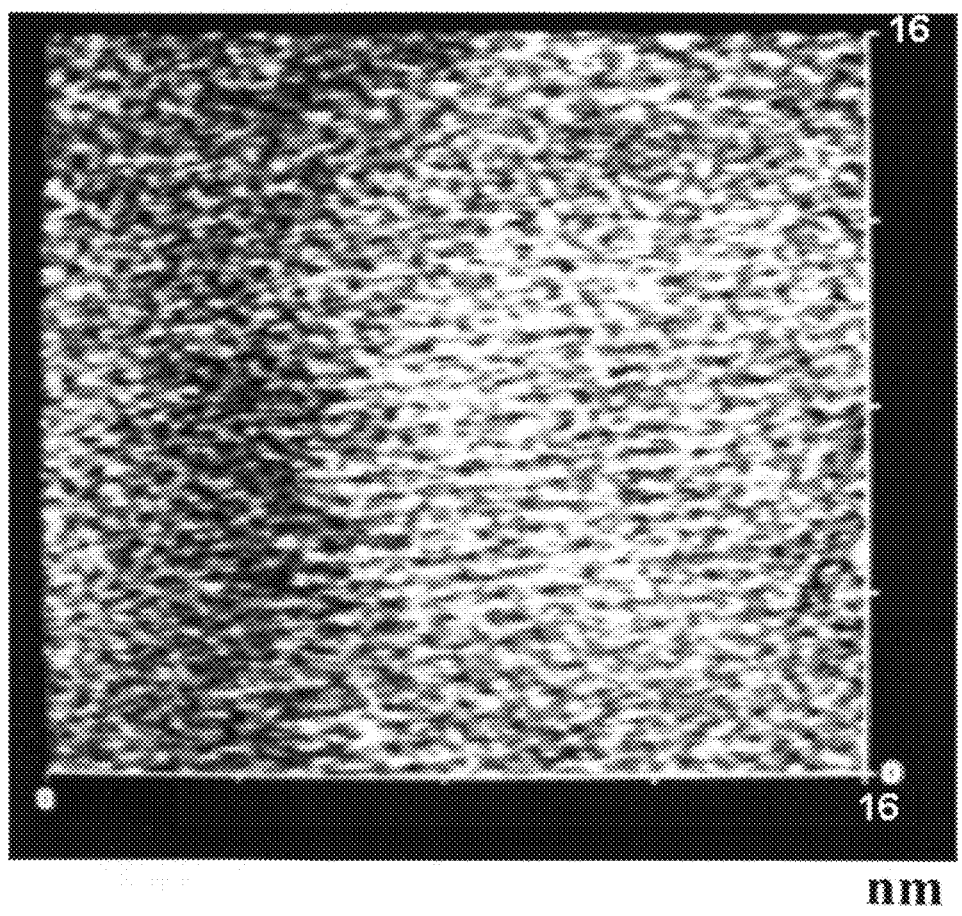

FIG. 21: Stepline on calcite in water faintly imaged in constant-height (feedback-) mode by non-contact dynamic force microscopy (inverted tapping). Other than that same as in FIGS. 19, 20.

Figure 22:
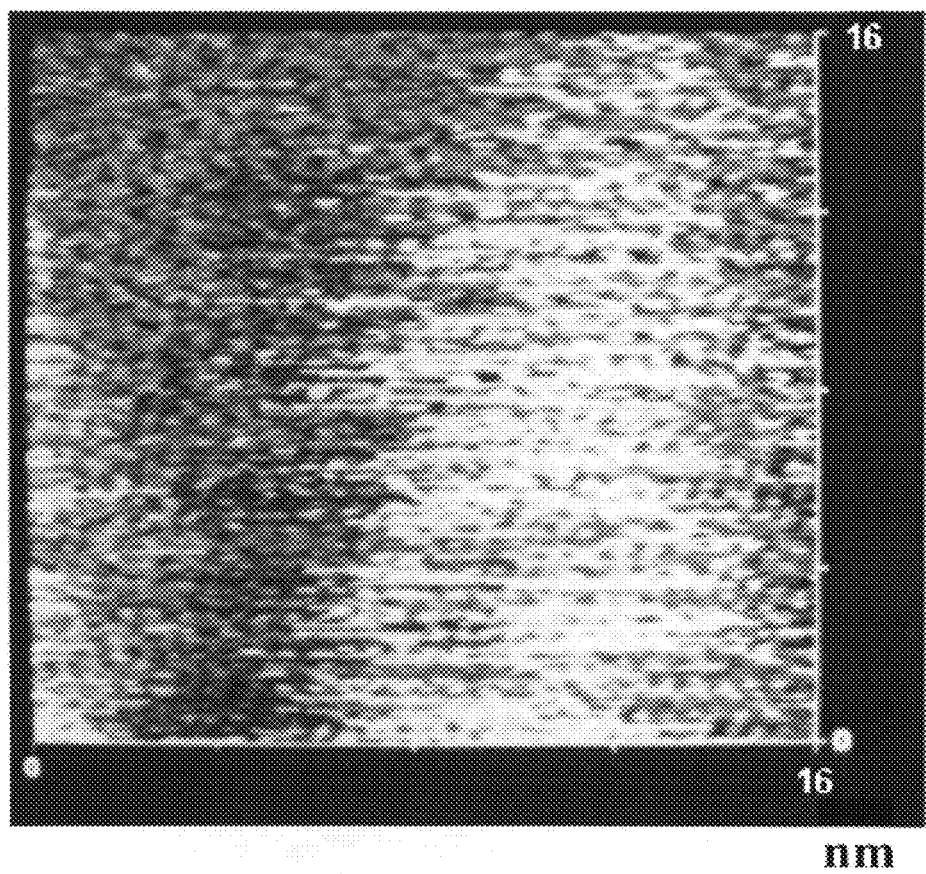

FIG. 22: Same stepline as in FIG. 21 imaged at slightly retracted tip (higher fly-hight of the tip above the sample)—the step line is visible much more pronouncedly, but not yet perfect—hence called almost true atomic resolution.

FIG. 23: A) Proposal for a non-contact dynamic force microscopy in a liquid with feedback control, where two coupled feedback loops are suggested to be integrated: One slow one acting on the z-position of the sample and thus maintaining an on average constant fly-height of the tip above the sample and a second fast feedback loop acting on the amplitude of the small driving piezo inducing the cantilever vibration and thus maintaining a constant cantilever (slope) oscillation amplitude. This latter fast feedback signal then will provide the higher-frequency image structures (small details like atomic scale corrugations) while the first slow feedback will provide the overall sample height, e.g. terrace-levels on a crystal surface. For comparison schematics of the customary methods: B) regular tapping mode AFM. C) regular FM-detection AFM.

FIG. 24: Instrumental design for a low-drift AFM for operation in ambient environments, in liquidous environments or even in moderate to high vacuum environments using a gas flow chamber that can be evacuated. It is noted that the backbone plates are made from very heavy, thermally very stable but slowly thermally equilibrating materials such as Invar or Quartz while the mechanical adjustment stages are made [13] from very light, thermally less stable but thermally rapidly equilibrating materials such as aluminum, magnesium or titanium.

REFERENCES

1. F. Ohnesorge, G. Binnig, Science 260, 1451 (1993).
2. F. J. Gießibl, Science 267, 68 (1995).
3. F. Ohnesorge, Surface and Interface Analysis 27, 379 (1999).
4. S. Rode et al., Langmuir 25, 2850 (2009).
5. Y. Sugawara, M. Ohta, H. Ueyama, S. Morita, Science 270, 1647 (1995).
6. F. J. Gießibl, S. Hembacher, H. Bielefeldt, J. Mannhart, Science 289, 422 (2000).
7. J. Israelachvili, "Intermolecular and Surface Forces" 2nd Ed., Academic Press, London 1992.
8. R. W. G. Wyckoff, "Crystal structures" (Wiley, N.Y. 1964).
9. F. M. Ohnesorge, Phys. Rev. B 61(8) (rapid comm.) R5121 (2000).
10. W. Kleber, "Einführung in die Kristallographie", 11. Edition (1971), VEB Verlag Technik Berlin, pp. 185.
11. Landau theory of phase transitions
12. T. E. Schäffer, J. P. Cleveland, F. Ohnesorge, D. A. Walters, P. K. Hansma, J. Appl. Phys. 80(7), 3622 (1996).
13. Lees Optical Instruments, Boulder, Colo., USA is a manufacturer for high quality optical mirror mounts who has manufactured the here used mechanical adjustment stages whose design was adapted from their standard mirror mount adjustment stages.

FIGURE LEGEND (FIG. 23: items 1-10; FIG. 24: items 10-23; FIG. 13: items 24, 25, 26)
1. Z-position
2. Drive piezo signal (fast feedback signal)
3. Sample piezo signal (slow feedback signal)
4. Cantilever amplitude
5. Constant interaction signal (drive piezo amplitude+sample piezo signal)—displayed inverted such that "up is up".
6. Drive piezo
7. Cantilever amplitude or sample piezo signal (feedback signal)—displayed inverted such that "up is up".
8. Sample
9. Sample z-piezo
10. Mirror
11. Optical mirror mount (adjustable)
12. Optical mirror mount (x-y-z-adjustable)
13. Laser diode
14. "Backbone"—vertical plate (Invar or Quartz glass)
15. "Backbone"—base plate (Invar or Quartz glass)
16. Cantilever holder (Invar or Quartz glass), with quartz glass window
17. Detector (x-y-adjustable)
18. Sample scanner stage, mechanical x-y-z-adjustment stage, in particular z-approach mechanism (mainly aluminium, or magnesium or light alloys, screws steel or titanium, bearings hardened steel and saphire).
19. Piezo scanner (e.g. piezo tube scanner)
20. Container for acoustic drive piezo and temperature gauge within liquid cell.
21. Post
22. Vibration isolation
23. Cantilever
24. Attractive force between the negative charge q at the very end of the tip and the dipole moment u of the (in water present) OH-group at that bond of the carbonate ion which protrudes out of the calcite cleavage surface right above such an OH-group at a tip-sample distance of approximately 0.3 nm: $F_{qu} \approx 6 \times 10^{-11}$N (vertical force component).
25. Attractive force between the negative charge q at the very end of the tip and the dipole moment u of the (in water present) OH-group at that bond of the carbonate ion which protrudes out of the calcite cleavage surface in the middle between two such carbonate sites carrying an hydrogen bonded hydrogen at a tip-sample distance of roughly 0.4-0.6 nm: $F_{qu} <\approx 5 \times 10^{-12}$N (vertical force component).
26. Attractive force between the negative charge q at the very end of the tip and the dipole moment u of the (in water present) OH-group at that bond of the carbonate ion which protrudes out of the calcite cleavage surface in the middle between two such carbonate sites carrying an hydrogen bonded hydrogen at a tip-sample distance of roughly 0.3 nm: $F_{qu} \approx 9 \times 10^{-12}$N (vertical force component).

The invention claimed is:

1. Atomic force spectroscopy method, characterized in that, that interatomic forces are quantitatively recorded between the front-most tip atom and an electronic orbital of the opposing sample atom using an atomic force microscope with at least atomic lateral resolution or better, wherein the atomic force microscope employs a passive drift compensation with respect to minimizing the x-y-z-drift of the cantilever as well as the x-y-z-drift of the sample, and with respect to each other, avoiding drift before it occurs in an experiment or a measurement, wherein backbone components (base plate and vertical plate) serve as a heat reservoir or a heat sink for the entire atomic force microscope, fabricated from low thermal conductivity at high heat capacity, thus very slowly thermally equilibrating materials, which further exhibit extreme hardness, stiffness, high specific weight, whereby any alternative selection of a set of materials fundamentally suitable for the mechanical design and construction is selected such that the specific types of physical material properties are maximized or minimized respectively, hence an optimizing selection is performed within the fundamentally suitable options of materials and are thus optimized, wherein the cantilever holder is fabricated from materials having said properties desired for backbone components, wherein all mechanical tilt- and vertical adjustment stages such as a sample scanner stage, are made from light but rapidly thermally equilibrating, high thermal conductivity at still moderately low thermal expansion coefficient and at still high specific heat capacity materials, while in preferred embodiments bearings of these mechanical adjustment stages are chosen extremely hard, whereby any alternative selection of a set of materials fundamentally suitable for the mechanical design and construction is selected such that the specific types of physical material properties are maximized or minimized respectively, hence an optimizing selection is performed within the fundamentally suitable options of materials and are thus optimized.

2. Atomic force spectroscopy method according to claim 1, wherein
wherein the atomic force microscope is operated in particular in the so-called variable deflection mode where the tip flies or hovers across the sample surface at a distance constant only on average, also during lateral movement of the probe tip, without a feedback control maintaining instantaneous constant force interaction.

3. Atomic force spectroscopy apparatus according to usage with the method in claim 2,
wherein
the cantilever holder is fabricated from materials having said properties desired for the backbone components and which above the cantilever serves as a transparent upper termination of a cell, particularly transparent for light of wavelengths ranging from IR to UV.

4. Atomic force spectroscopy method according to claim 3, wherein
wherein the said interatomic forces are recorded in liquids and a Quartz glass window above the cantilever serves as upper termination of a cell transparent for the optical cantilever motion detection's light beam of wavelengths ranging from IR to UV, which the instrument is comprising.

5. Atomic force spectroscopy method according to claim 4, wherein the atomic force microscope is operated in an aqueous solution of suitable ionic strength such that all medium and longer range attractive forces between tip and sample material are compensated by at least one of the following effectively short, medium and longer range repulsive forces such as steric repulsion by the overlap of Stern- and/or Helmholtz layers, such as double layer repulsion by the overlap of Debye screening clouds of hydrated ions of equal charge, such as osmotic statistical forces of overlapping clouds of uncharged particles, such as attractive van der Waals forces between the liquid and the tip and the sample material which are thus pulling the liquid into the gap between tip and sample resulting in an effectively more repulsive or less attractive net van der Waals force then effectively acting between tip and sample.

6. Atomic force spectroscopy apparatus for usage according to the methods in claim 5,
wherein
wherein very solid and heavy backbone mechanical components such as a base plate carrying the mechanical x-y-z adjustment stage for the sample scanner and the cantilever holder with the liquid cell and the optical or else cantilever bending detection system or such as the vertical plate carrying the cantilever bending detection system's mechanical adjustment stages as well as the cantilever holder with liquid cell itself are all fabricated from very small and slow thermal conductivity at high heat capacity, thus very slowly thermally equilibrating materials such as in preferred embodiments Invar or Quartz which further exhibit extreme hardness, stiffness, high specific weight,
whereby any alternative selection of a set of materials fundamentally suitable for the mechanical design and construction is selected such that the specific types of physical material properties are maximized or minimized respectively, hence an optimizing selection is performed within the fundamentally suitable options of materials and are thus optimized,
wherein the cantilever holder simultaneously forming the liquid cell is fabricated from Invar or stainless steel or Quartz in preferred embodiments having said properties desired for backbone components and as an alternative a Quartz glass window above the cantilever serves as upper termination of the liquid cell transparent for the optical cantilever motion detection's light beam of wavelengths ranging from IR to UV,
wherein all mechanical tilt- and vertical adjustment stages such as the sample scanner stage, light source mount with tilt and vertical adjustment stage, mirror mount with tilt and vertical adjustment stage, detector mount with x-y adjustment stage are made from very light but rapidly thermally equilibrating, high thermal conductivity at still moderately low thermal expansion coefficient and at still high specific heat capacity materials such as in preferred embodiments aluminium, magnesium, titanium or alloys thereof, while in preferred embodiments bearings of these mechanical adjustment stages are chosen extremely hard in preferred embodiments using materials such as chromium-vanadium-molybdenum steel, and saphire, boron carbide, boron nitride or diamond,
whereby any alternative selection of a set of materials fundamentally suitable for the mechanical design and construction is selected such that the specific types of physical material properties are maximized or minimized respectively, hence an optimizing selection is performed within the fundamentally suitable options of materials and are thus optimized.

7. Atomic force spectroscopy method according to claim 6, wherein
wherein the atomic force microscope uses the so-called optical beam deflection detection system for sensing the cantilever's angular motion comprising an infrared or a visible red or a visible green or a visible blue or an ultra-violet light source, in particular a laser or tunable laser.

8. Atomic force spectroscopy apparatus for usage in the methods according to claim 7,
wherein
wherein all mechanical tilt- and vertical adjustment stages such as the sample scanner stage, light source mount with tilt and vertical adjustment stage, mirror mount with tilt and vertical adjustment stage, detector mount with x-y adjustment stage are all realized in form of high quality optical mirror mounts, which are made from very light but rapidly thermally equilibrating, high thermal conductivity at still moderately low thermal expansion coefficient and at still high specific heat capacity materials such as in preferred embodiments aluminum, magnesium, titanium or alloys thereof, while bearings of these mechanical adjustment stages such as the sphere, the grove and the plate are chosen extremely hard in preferred embodiments using materials such as chromium-vanadium-molybdenum steel for the balls and the grove's guiding rods, and saphire, boron carbide, boron nitride or diamond for the counter bearings, where all adjustments screws in preferred embodiments are fine thread screws made from hardened steel or titanium turning in brass bearings,
whereby any alternative selection of a set of materials fundamentally suitable for the mechanical design and construction is selected such that the specific types of physical material properties are maximized or minimized respectively, hence an optimizing selection is performed within the fundamentally suitable options of materials and are thus optimized.

9. Atomic force spectroscopy method using the apparatus according to claim 8,
wherein
wherein the light source can be extremely rapidly modulated in intensity such that small bandwidth lock-in technique can be employed to reduce noise from stray reflections and external perturbing light sources,
or alternatively, this light source is kept extremely constant with respect to its intensity, such that in the worst case a very slow drift of the smoothing-filtered intensity powered by a battery or a rechargeable battery occurs on a time scale of minutes to hours.

10. Atomic force spectroscopy apparatus for use with the preceding methods, according to claim 9,
wherein
wherein the entire microscope is hermetically enclosed in an air tight, light tight, largely sound proof, heavy casing which allows exchange of gases, evacuation to moderate or high vacuum and temperature control.

11. Atomic force spectroscopy methods according to claim 10,
where the sample and or its enclosing immediate or entire environment is temperature controlled,
wherein the sample is directly mounted with good thermal contact onto a Peltier-element and this Peltier-element is directly mounted with good thermal contact onto a passive cooling element and this passive cooling element carrying both the Peltier element and the sample is in turn mounted on the x-y-z-scanning stage of the AFM,
wherein the passive cooling element reaches partly into a heat sinking reservoir in form of a liquid heat bath,
wherein the passive cooling element is made from aluminum or magnesium or titanium or alloys of those,
wherein this cooling liquid of the heat reservoir possesses a high heat capacity and a negligible surface tension,
wherein this cooling liquid is a low surface tension liquid such as one of the following, propanol, butanol, pentanol, hexane, hexanol, heptane, heptanol, octane, octanol, nonane, nonanol, decane, decanol, all in straight (n-) or iso-forms or water with an approximately monomolecular film at the air-water interface of any surfactant, lipid, alkane, alkanole,
wherein a course temperature control is achieved by heating and cooling the heat bath or the entire sample environment with a second large Peltier element or other temperature control like any hot or cold plate,
wherein the fine temperature control is achieved with short time constant by regulating the current through the sample holder Peltier-element feedback-looped through a signal coming from a thermo couple immersed in the liquid cell and thus in close vicinity within a 0.1 mm range to the cantilever,
wherein the entire atomic force microscope is inserted in a temperature controlled gas flow box under slight or moderate vacuum.

12. Atomic force spectroscopy method according to claim 11, where the temperature control further integrates a small z-travel control operative upon applying a feedback loop's signal, where small z-travels in the range of atomic diameters can easily be reached by using the thermal expansion and phonon energy.

13. Atomic force spectroscopy method according to at least one of the claims 1-12,
wherein an in-situ calibrated AFM is used, which has been calibrated independent of external instrument calibrations such as manufacturer-provided z-piezo travel— and cantilever spring constant—calibrations,
wherein the in-situ calibration is performed in particular on at least one of the following systems such as calcite in distilled water or in very dilute aqueous ionic solution, aragonite in distilled water or in very dilute aqueous ionic solution, mica in 150 mM NaCl-solution, rhodocrosite in distilled water or in very dilute aqueous ionic solution, Si-wafers in aqueous ionic solution, lipid layers deposited on Si or mica or calcite in water or aqueous ionic solution,
where a calibrating force anchor point for the AFM's force-versus-distance curve is obtained from the calcite-aragonite phase transition occurring at a loading pressure of the tip of about 6 kbar at about 20° C. during imaging of a calcite/aragonite crystal surface in water independently of the said external instrument calibrations,
where the separation between the front-most tip atom and opposing sample atom is in situ calibrated in distilled water or aqueous ionic solution by counting the hydrated ions' diameter sized periodicities—corrected for cantilever deflections—in the AFM's force versus distance curve which are originating from steric repulsion through liquid layer packing effects at very close tip-sample separations of a few 10, about 1-50, liquid-molecular diameters or less.

14. Atomic force spectroscopy method according to claim 13,
wherein here with subatomic lateral resolution,
wherein the force-spectroscopic information is used for imaging by plotting the in the variable deflection mode quantitatively measured interatomic forces as a function of lateral tip position on the subatomic lateral scale while the tip remains at a given constant zero-force distance flying or hovering above the sample surface,
wherein in particular on calcite in distilled water or very dilute calcium carbonate solution, the different atom species can be distinguished on the calcite (10 14)-cleavage plane, and even it can be distinguished whether a protruding oxygen atom is $sp^2$- or $sp^3$-hybridized in the carbonate ion, not only the ion species can be distinguished,
wherein the front-most tip atom senses the highest attractive force just above the carbonate ions' protruding oxygen atom and senses a significantly smaller attractive force just above the calcium ion, where all ion species can be hydrated or not,
wherein attractive force spikes caused by the protruding oxygen atoms are always located with respect to their lateral position on the sample surface within a small circle having the diameter of an oxygen atom, but are roughly only a tenth of the diameter in lateral extent or smaller,
wherein at least 2 electronic orbitals within a single one of the said protruding $sp^2$- or $sp^3$-hybridized oxygen atoms are separately resolved which thus allows to distinguish in the image, whether a specific protruding oxygen atom is $sp^2$- or $sp^3$-hybridized, where the $sp^2$-hybridization corresponds to observing a double force spike within one atomic diameter of the said protruding oxygen atoms, while $sp^3$-hybridization corresponds to observing only one pronounced force spike within that 1-Angström diameter.

15. Atomic force spectroscopy method according to at least one of the claim 1 or 14 with atomic or subatomic lateral resolution,
  wherein the AFM cantilever is vibrated such that the frontmost tip atom exhibits a periodic oscillation,
  wherein the said oscillation can have the intrinsic resonance frequency of the cantilever or a higher harmonic intrinsic mode's frequency or can have the frequency of an acoustic resonance of the liquid filled cell or the liquid itself surrounding the cantilever,
  wherein a feedback control is used just like in commercial tapping mode AFM where, however, the sign of the feedback response is inverted as compared to regular commercial tapping mode AFM,
  wherein the said inverted feedback control will at a slightly higher than minimum but non-zero tip-sample separation retract the sample upon detected cantilever slope amplitude increase or will reduce the drive amplitude for the cantilever vibration or both simultaneously, the latter in form of two coupled feedback loops,
  wherein the said detected cantilever slope amplitude's increase is a quantitative measure of the attractive interatomic forces,
  wherein a higher measured cantilever's slope amplitude means at slightly larger than minimum but non-zero tip-sample separation in the regime of arrows 1-4 of the sample site averaged force versus distance curve (FIG. 3) a higher attractive interatomic force between frontmost tip-atom and opposing sample atom,
  wherein this dynamically measured spectroscopic force interaction is used for imaging by plotting the feedback correction signal maintaining the cantilever's slope amplitude constant as a function of the x-y position of the tip or by plotting the feedback correction signal acting on the sample's z-position maintaining a constant average flying—or hovering—height of the tip oscillating slightly above the sample or already even in weak or snug contact with the sample, or by plotting both of these said feedback correction signals added in case of 2 coupled feedback loops as described,
  wherein bright spots in the said images are such locations on the sample, where the detected cantilever slope amplitude has locally increased due to elevated local sample details and thus a first slow feedback loop has caused the z-piezo to retract the sample locally further away from the tip by roughly one atomic corrugation or by another mainly larger local sample detail's elevation on the sample surface and/or a second fast feedback loop acting on the drive-piezo's signal has decreased the cantilever's slope amplitude by a measure corresponding to one atomic corrugation or other very small sample structural detail,
  wherein a first slower feedback control also measuring the vibrated cantilever's slope amplitude or the cantilever's average deflection or both maintain a constant average tip-sample separation by acting on a z-piezo which can be controlling at least one of the following, the average z-position of the sample or the average z-position of the cantilever, where the feedback control operates in the usual orientation retracting the sample when the cantilever gets deflected away from the sample regarding its average position,
  wherein a second fast feedback control only measuring the cantilever's slope amplitude is acting on the drive-piezo signal such that the cantilever's slope amplitude is maintained constant while the tip is scanning laterally across the sample surface,
  wherein both feedback correction signals which maintain a constant cantilever slope amplitude and a constant average height of the tip above the sample, either separately or combined by summation with suitable sign such that elevated features appear as bright spots in the grey-scale representation represent the height information of the sample surface topography in two different bandwidth ranges, where the first slow feedback provides the height information of larger scale structural details on the sample like terrace-levels, while the fast second feedback provides the height information of small structural details on the sample like atomic corrugations,
  wherein the said average z-position of the cantilever can also be derived from analyzing the cantilever oscillation or it can be derived from a time averaged detection signal,
  wherein several cantilever deflection techniques can be combined such as optical laser beam deflection technique, such as optical interferometry, such as fiber optical interferometry, such as piezo-resistive lever deflection technique, where the latter is preferably used for detecting pure AC-signals such as cantilever vibration amplitudes and frequencies at narrow bandwidth.

16. Atomic force spectroscopy method according to claim 15 with atomic or subatomic lateral resolution,
  wherein the said here used amplitude and claimed demodulation technique can as well be replaced by frequency demodulation technique,
  and can also comprise and or add frequency demodulation technique,
  for improving the signal to noise ratio at compromising scan speeds.

17. Atomic force spectroscopy method according to claim 14 or 16,
  wherein the said in-situ calibration of the instrument is also used to initially correct the manufacturer-given instrument calibrations in order to obtain the more accurate momentary instrument calibration of scanner piezo-travel and cantilever spring constant and then using the this way independently for the current and further sets of experiments obtained piezo- and cantilever spring constant calibration for quantitative sample analysis by AFM.

18. Atomic force spectroscopy method according to claim 13,
  wherein the said in-situ calibration of the instrument is also used to initially correct the manufacturer-given instrument calibrations in order to obtain the more accurate momentary instrument calibration of scanner piezo-travel and cantilever spring constant and then using the this way independently for the current set of experiments obtained piezo- and cantilever spring constant calibration for quantitative sample analysis by AFM.

19. Atomic force spectroscopy method according to claim 14 or 18,
  wherein a feedback control loop maintains constant interaction between the tip and the sample not only regarding an average vertical tip position but also instantaneously realizing an actual constant height mode in an non-contact operation of the AFM in a liquid,
  wherein the cantilever base support is mounted onto a very fast piezo-actuator moving the cantilever's base and thus moving the vertical tip-position very fast and at a very small travel, where this said cantilever piezo is connected to a feedback loop with short time constant thus controlling the instantaneous tip's z-position, wherein alternatively the cantilever base support is mounted onto a very fast piezo-actuator coupling a vibration and phonon energy into the cantilever's base and thus into the cantilever spring, where the said small cantilever piezo is connected to a feedback loop with short time constant thus controlling the instantaneous cantilever amplitude by manipulation the piezo's drive amplitude and thus controlling the instantaneous tip oscillation amplitude, wherein the sample is mounted onto a large x-y-z-scanner piezo as usually used in scanning probe microscopy where a slower feedback loop is connected to the sample's z-piezo exhibiting large travel thus maintaining an average tip-sample separation constant, wherein in a liquid the cantilever is vibrated in particular above an intrinsic cantilever harmonic resonance mode's frequency thus using one of the said acoustic resonance peaks of the liquid filled liquid cell surrounding the cantilever.

20. Atomic force spectroscopy apparatus for use in the methods according to claim 19, wherein the fast and small travel z-piezo is integrated into the cantilever or tip itself, such that the tip elongates and retracts upon applying a feedback loop signal, where amplitudes of atomic diameter lengths can easily be reached even using merely the piezo-electric effect of the commonly used $Si/SiO_2$-tips itself, wherein the fast and small z-travel-control of the tip is integrated into the cantilever and the tip itself, such that the tip elongates and retracts upon applying a feedback loop's signal, where amplitudes of atomic diameter lengths can easily be reached by using the thermal expansion of the tip material when driving a heat-dissipating current through a connecting lead through cantilever and tip as the feedback's manipulated parameter, where commercially available piezo-resistive cantilevers can function for this method already with minor changes, where the commercially available piezo-resistive cantilever can be vibrated with an atomic—or even nm—scale amplitude by applying an alternating current of desired frequency and amplitude to them, wherein the imaging tip itself is suggested to be fabricated using thin film technology from piezo-electric material while the tip-surface can be still consisting of the commonly used $Si/SiO_2$ or diamond material, wherein the cantilever beam itself is suggested to be fabricated in such a way that it contains at least one piezo-electrically or piezo-resistively active layer or both such that the cantilever vibration can be conveniently and accurately be induced by the this way ultimately small piezo-drive instead of using an external larger z-piezo component at the base of the cantilever support, which would bring more perturbing oscillation energy into the entire liquid cell in order to drive the cantilever at the same amplitude as could be realized with much less drive energy using the said microfabricated piezo-electric or piezo-resistive layer or both integrated into the AFM-cantilever itself.

21. Atomic force spectroscopy method according to claim 14 or 16 or 20, wherein pixel-wise the AFM's force versus distance curves are recorded at subatomic lateral resolution at a rapid cycle rate of at least 50 Hz while the sample is very slowly laterally scanned at a scan velocity of at least 1-2 Angströms per second, wherein cantilevers with a spring constant of at least 0.1N/m are used, wherein the so-called AFM's force versus distance curve plots cantilever deflection force F versus relative sample position z, where the actual force F versus true tip-sample separation d is directly derived by the formula d=z+"cantilever-deflection"−"cantilever-base-offset" if there is no jump-into-contact, wherein these pixel-wise complete force F versus tip-sample separation d curves are recorded as a function of x-y position of the tip above the sample, thus stored in a 4-dimensional picture, wherein from the said 4-dimensional data for every actual tip-sample separation d a complete 3-dimensional topography image can be deducted.

22. Atomic force spectroscopy method according to claim 21, wherein quartz oscillators having a resonance frequency of 0.01-100 MHz are alternatively used for achieving much higher recording rates reaching force-curve cycle rates of at least a 1-100 kHz order and thus recording rates for a whole picture containing the said 4-dimensional dataset of at least one frame per second or more for 256×256 pixels in the lateral x-y-direction.

23. Atomic force spectroscopy method according to claim 14 or 16 or 20 or 22, wherein the AFM-tip is mounted to a standard calibrated high Q quartz oscillator as used in radio transmission and receiving technology, wherein frequency demodulation technique is used for the force gradient detection of the tip sample force interaction with highest sensitivity, wherein standard FM-radio receiver technology electronic circuitry is used for the detection, wherein alternatively amplitude demodulation technique is used for the force gradient detection of the tip-sample force interaction for optimizing for highest possible scanning speed especially for operation in a liquid, wherein standard AM-radio technology electronic circuitry is used for the detection, in particular the single side band method for low noise optimization.

24. Atomic force spectroscopy method according to claim 21, wherein the AFM-tip is mounted to a standard calibrated high Q quartz oscillator as used in radio transmission and receiving technology, wherein frequency demodulation technique is used for the force gradient detection of the tip sample force interaction with highest sensitivity, wherein standard FM-radio receiver technology electronic circuitry is used for the detection, wherein alternatively amplitude demodulation technique is used for the force gradient detection of the tip-sample force interaction for optimizing for highest possible scanning speed especially for operation in a liquid, wherein standard AM-radio technology electronic circuitry is used for the detection, in particular the single side band method for low noise optimization.

* * * * *

UNITED STATES PATENT AND TRADEMARK OFFICE
CERTIFICATE OF CORRECTION

PATENT NO. : 8,443,461 B2
APPLICATION NO. : 13/227733
DATED : May 14, 2013
INVENTOR(S) : Frank Michael Ohnesorge It is certified that error appears in the above-identified patent and that said Letters Patent is hereby corrected as shown below:

In the Claims

Column 25, lines 1-2 (Claim 15, line 1-2) "according to at least one of the claim 1 or 14" should read --as in any of claims 1-12 or 14--.

Column 26, line 27 (Claim 16, line 3) after "said" delete "here used amplitude and".

Column 26, line 27 (Claim 16, line 3) after "claimed" insert --amplitude--.

Column 27, lines 60-61 (Claim 21, line 1-2) "claim 14 or 16 or 20" should read --any of claims 14, 16, or 20--.

Column 28, lines 29-30 (Claim 23, lines 1-2) "claim 14 or 16 or 20 or 22" should read --any of claims 14, 16, 20, or 22--.

Signed and Sealed this
Second Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,443,461 B2
APPLICATION NO. : 13/227733
DATED : May 14, 2013
INVENTOR(S) : Frank Michael Ohnesorge It is certified that error appears in the above-identified patent and that said Letters Patent is hereby corrected as shown below:

Title Page, Item (73) Assignee: "Frank Michael Ohuesorge" should read
-- Frank Michael Ohnesorge --.

Signed and Sealed this
Ninth Day of July, 2013

Teresa Stanek Rea
*Acting Director of the United States Patent and Trademark Office*